US008744836B2

(12) United States Patent
Nagao

(10) Patent No.: US 8,744,836 B2
(45) Date of Patent: Jun. 3, 2014

(54) FINITE STATE TRANSDUCER DETERMINIZING DEVICE AND FINITE STATE TRANSDUCER DETERMINIZING METHOD

(75) Inventor: Manabu Nagao, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 141 days.

(21) Appl. No.: 13/231,065

(22) Filed: Sep. 13, 2011

(65) Prior Publication Data

US 2012/0046935 A1 Feb. 23, 2012

Related U.S. Application Data

(63) Continuation of application No. PCT/JP2009/068016, filed on Oct. 19, 2009.

(30) Foreign Application Priority Data

Mar. 30, 2009 (JP) .................................. 2009-082866

(51) Int. Cl.
*G06F 17/27* (2006.01)
*G10L 15/00* (2013.01)

(52) U.S. Cl.
USPC .............................................. 704/9; 704/231

(58) Field of Classification Search
USPC ............................................ 704/9, 231–257
See application file for complete search history.

(56) References Cited

U.S. PATENT DOCUMENTS

| 6,032,111 | A | * | 2/2000 | Mohri | ................................ | 704/9 |
| 6,456,971 | B1 | | 9/2002 | Mohri et al. | | |
| 2010/0082522 | A1 | | 4/2010 | Nagao | | |

FOREIGN PATENT DOCUMENTS

| JP | 2006-031403 | 2/2006 |
| JP | 2009-058989 | 3/2009 |

OTHER PUBLICATIONS

Mohri. On some applications of finite-state automata theory to natural language processing, Natural Language Engineering, 1996, vol. 2, Issue 1, pp. 61-80.
Berstel. Transductions and context-free languages, 1979, Chapter IV, Section 6, Electronic edition: http://www-igm.univ-mlv.fr/~berstel/LivreTransductions/LivreTransductions05mai2007.pdf.
Allauzen, et al. An optimal pre-determinization algorithm for weighted transducers, Theoretical Computer Science, 2004, vol. 328, Issue 1-2, pp. 3-18.
Mohri, et al. Full expansion of context-dependent networks in large vocabulary speech recognition, in proceedings of the international conference on acoustics, speech, and signal processing (ICASSP '98), 1998.

(Continued)

*Primary Examiner* — Samuel G Neway
(74) *Attorney, Agent, or Firm* — Amin, Turocy & Watson, LLP

(57) ABSTRACT

According to one embodiment, a finite state transducer determinizing device includes a symbol determination unit, a state merging unit, and a single-value processing unit. The symbol determination unit generates an identification symbol different from an input symbol assigned to each transition of a finite state transducer. The state merging unit extracts one or more states at a transition destination by the same input symbol from among the states of the finite state transducer and generates states having the extracted states as sub-states. The single-value processing unit applies the input symbol assigned to each transition of the finite state transducer or the identification symbol as an input symbol of a transition between the states generated by the state merging unit to perform determinizing.

10 Claims, 19 Drawing Sheets

(56) References Cited

OTHER PUBLICATIONS

Allauzen, et al. Generalized optimization algorithm for speech recognition transducers, in proceedings of the international conference on acoustics, speech, and signal processing (ICASSP '03), 2003.

International Search Report for International Patent Application No. PCT/JP2009/068016 mailed on Dec. 22, 2009.

Written Opinion for International Patent Application No. PCT/JP2009/068016 mailed on Dec. 22, 2009.

* cited by examiner

FIG.3A

```
determinize (T₁, T₂)
```

1   $Q_2 \leftarrow \phi, E_2 \leftarrow \phi, \Sigma_2 \leftarrow \Sigma_1, F_2 \leftarrow \phi$ 2   $\lambda_2 \leftarrow \underset{i \in I_1}{\oplus} \lambda_1(i)$ 3   $i_2 \leftarrow \{(i, \lambda_2^{-1} \otimes \lambda_1(i)) \mid i \in I_1\}$ 4   $S \leftarrow \{i_2\}, Q_2 \leftarrow Q_2 \cup \{i_2\}$ 5   while $S \neq \phi$ 6     $q_2 \leftarrow \text{pop}(S)$ 7     if $\{w \in \Sigma_1 \mid (q, w) \in q_2\} \neq \phi$ 8       let $q, w : (q, w) \in q_2$ 9       $q_{n2} \leftarrow \{(q, 1^\#)\}$ 10       $E_2 \leftarrow E_2 \cup \{(q_2, w, 1^\#, q_{n2})\}$ 11       if $q_{n2} \notin Q_2$ 12         $\text{push}(S, q_{n2}), Q_2 \leftarrow Q_2 \cup \{q_{n2}\}$ 13     else 14       if $\{q \in F_1 \mid (q, w) \in q_2\} \neq \phi$ 15         $W \leftarrow \underset{q \in F_1, (q, w) \in q_2}{\cup} \{w \otimes \rho_1(q)\}$ 16         $w_2 \leftarrow \underset{w \in W}{\oplus} w$ 17         if $\{w \mid w \in W, w = w_2\} \neq \phi$ 18           $\rho_2(q_2) \leftarrow w_2, F_2 \leftarrow F_2 \cup \{q_2\}$ 19         foreach $w \in W$ such that $w \neq w_2$ 20           $q_{n2} \leftarrow \phi$ 21           $E_2 \leftarrow E_2 \cup \{(q_2, \text{aux}(q_{n2}, w), w, q_{n2})\}, \Sigma_2 \leftarrow \Sigma_2 \cup \{\text{aux}(q_{n2}, w)\}$ 22           if $q_{n2} \notin Q_2$ 23             $\rho_2(q_{n2}) \leftarrow 1^\#, Q_2 \leftarrow Q_2 \cup \{q_{n2}\}, F_2 \leftarrow F_2 \cup \{q_{n2}\}$ 24       foreach $\alpha \in \Sigma_1$ 25         $\theta \leftarrow \underset{q_n \in \gamma(q_2, \alpha)}{\cup} \left\{ \left(q_n, \underset{(w, e) \in \xi(q_2, \alpha, q_n)}{\cup} \{w \otimes \text{out}(e)\}\right) \right\}$

FIG.3B 26   foreach $(q_n, W) \in \theta$ such that $|W| > 1$

27       $q_{n2} \leftarrow \{(q_n, \alpha)\}$ 28       foreach $w \in W$

29           $E_2 \leftarrow E_2 \cup \{(q_2, aux(q_{n2}, w), w, q_{n2})\}, \Sigma_2 \leftarrow \Sigma_2 \cup \{aux(q_{n2}, w)\}$ 30           if $q_{n2} \notin Q_2$ 31               $push(S, q_{n2}), Q_2 \leftarrow Q_2 \cup \{q_{n2}\}$ 32   if $\{(q_n, W) \in \theta \mid |W| = 1\} \neq \phi$ 33       $w_2 \leftarrow \bigoplus_{(q_n, W) \in \theta, w \in W, |W|=1} w$ 34       $q_{n2} \leftarrow \{(q_n, w_2^{-1} \otimes w) \mid (q_n, W) \in \theta, |W| = 1, w \in W\}$ 35       $E_2 \leftarrow E_2 \cup \{(q_2, \alpha, w_2, q_{n2})\}$ 36       if $q_{n2} \notin Q_2$ 37           $push(S, q_{n2}), Q_2 \leftarrow Q_2 \cup \{q_{n2}\}$ aux(q, v)

1   if $\{(q_1, v_1, y_1) \in Y | q_1 = q, v_1 = v\} \neq \phi$ 2      return $y_1$ 3   $y \leftarrow \text{make\_aux}(|Y| + 1)$ 4   $Y \leftarrow Y \cup \{(q, v, y)\}$ 5   return $y$

```
1  W ←     ⋃          w
        q∈F₁,(q,w)∈q₂,w≠1ᵗ

2  if W = φ

3      F₂ ← F₂ ∪ {q₂}

4  foreach w ∈ W 5      q_{n2} ← φ

6      E₂ ← E₂ ∪ {(q₂, aux(q_{n2}, w), w, q_{n2})}, Σ₂ ← Σ₂ ∪ {aux(q_{n2}, w)}

1    $F_2 \leftarrow F_2 \cup \{q_2\}$

2    $W \leftarrow \{x | x = w \otimes y, x \neq 1^\#, y \in \rho_1(q), (q, w) \in q_2, q \in F_1\}$ 3    if $|W| > N$ 4      $q_{n2} \leftarrow \phi$ 5      if $q_{n2} \notin Q_2$ 6        $\rho_2(q_{n2}) \leftarrow \phi, Q_2 \leftarrow Q_2 \cup \{q_{n2}\}, F_2 \leftarrow F_2 \cup \{q_{n2}\}$ 7      while $|W| > N$ 8        let $w : w \in W$ 9        $E_2 \leftarrow E_2 \cup \{(q_2, \text{aux}(q_{n2}, w), w, q_{n2})\}, \Sigma_2 \leftarrow \Sigma_2 \cup \{\text{aux}(q_{n2}, w)\}$ 10       $W \leftarrow W \setminus \{w\}$ 11    $\rho_2(q_2) \leftarrow W$

FIG.19

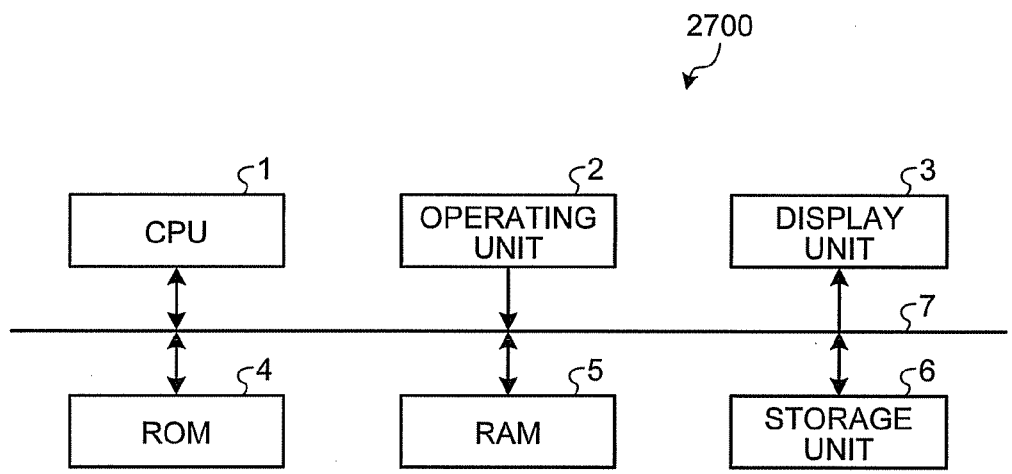

```
aux(q,v)
1   (x,y) ← v
2   return aux_0(q,x)
```

FINITE STATE TRANSDUCER DETERMINIZING DEVICE AND FINITE STATE TRANSDUCER DETERMINIZING METHOD

CROSS-REFERENCE TO RELATED APPLICATIONS

This application is a continuation of PCT international application Ser. No. PCT/JP2009/068016 filed on Oct. 19, 2009 which designates the United States, and which claims the benefit of priority from Japanese Patent Application No. 2009-082866, filed on Mar. 30, 2009; the entire contents of which are incorporated herein by reference.

FIELD

Embodiments described herein relate generally to a finite state transducer determinizing device and a finite state transducer determinizing method.

BACKGROUND

A finite state transducer (FST) which is a kind of finite state automation (FSA) is used in various fields, such as natural language processing or speech recognition. Formally, the FST is expressed by a six-tuple $(Q, \Sigma, \Delta, E, I, F)$. Q denotes a set of states, $\Sigma$ denotes a set of input symbols, E denotes a set of transitions, I denotes a set of initial states, F denotes a set of final states, and $\Delta$ denotes a set of output symbols. In the FST, the transition E is $E \subseteq Q \times \Sigma \times \Delta^* \times Q$. $\Delta^*$ is the Kleene closure of $\Delta$, and refers to a set of all symbol sequences which can be created by combinations of null symbol sequences $\epsilon$ and $\Delta$. If the output symbols are excluded from the FST, the FSA is implemented. The FST is also called a generalized sequential machine.

When the FST is nondeterministic, this means that the same input symbol sequence is assigned to a plurality of paths. Formally, this means that, when the size of a set X (the number of components) is expressed by $|X|$, and a set of paths which can be transited from a state $q \in Q$ by an input symbol sequence $w \in \Sigma^*$ is $\Pi(q,w) \subseteq E^*$, there is q such that the condition $|\Pi(q,w)| > 1$ is satisfied. This FST is referred to as a nondeterministic finite state transducer (NFST). Meanwhile, when the FST is deterministic, this means that there is only one path to the maximum when a certain input symbol sequence is applied. Formally, this means that the condition $|\Pi(q,w)| \leq 1$ is satisfied for all of $q \in Q$ and $w \in \Sigma^*$. This FST is referred to as a deterministic finite state transducer (DFST). Conversion of NFST to DFST is referred to as determinizing. The determinizing is carried out, for example, by a method described in U.S. Pat. No. 6,456,971 or M. Mohri, "On Some Applications of Finite-State Automata Theory to Natural Language Processing," Natural Language Engineering, 1996, vol. 2, issue 1, Pages 61-80.

However, in determinizing a non-single-valued NFST by the method of the related art, it is necessary to perform preprocessing, which includes a step of finding a portion responsible for a non-single value and a step of converting the found portion to a single value to form a single-valued NFST ("single value" will be described below).

BRIEF DESCRIPTION OF THE DRAWINGS

FIG. 3A is a pseudo code (first view) illustrating the details of a finite state transducer determinizing method of this embodiment;

FIG. 3B is a pseudo code (second view) illustrating the details of a method of determinizing a finite state transducer of this embodiment;

FIG. 18 is a pseudo code of an example where an FST which may have N final outputs is processed;

FIG. 19 is a diagram illustrating an example of a hardware configuration;

DETAILED DESCRIPTION

Figure 1:
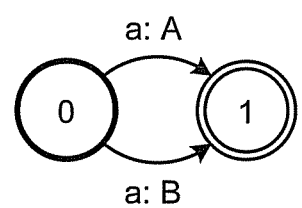
FIG. 1 is a diagram illustrating an example an FST having a twins property.

In general, according to one embodiment, a finite state transducer determinizing device includes a symbol determination unit, a state merging unit, and a single-value processing unit. The symbol determination unit generates an identification symbol different from an input symbol assigned to each transition of a finite state transducer. The state merging unit extracts one or more states at a transition destination by the same input symbol from among the states of the finite state transducer and generates states having the extracted states as sub-states. The single-value processing unit applies the input symbol assigned to each transition of the finite state transducer or the identification symbol as an input symbol of a transition between the states generated by the state merging unit to perform determinizing.

Hereinafter, embodiments will be described with reference to the drawings.

First Embodiment

An NFST is single-valued or non-single-valued. When the NEST is single-valued, this means that there is one output to the maximum even when any input symbol sequence is input to the NFST. Formally, this means that, when an output symbol sequence of a path $\pi \in \Pi(q,w)$ is out($\pi$), the condition $|\{out(\pi)|\pi \in \Pi(q,w), q \in Q, w \in \Sigma^*\}| \leq 1$ is satisfied. Similarly, when the NFST is non-single-valued, this means that the condition $|\{out(\pi)|\pi \in \Pi(q,w), q \in Q, w \in \Sigma^*\}| > 1$ is satisfied.

If the determinizing of the non-single-valued NFST is performed by the method described in U.S. Pat. No. 6,456,971, an output symbol which has been present before the determinizing may be erased. According to the method described in "On Some Applications of Finite-State Automata Theory to Natural Language Processing", the determinizing may not end. This situation occurs when the FST does not have a twins property described below (Jean Berstel, "Transductions and Context-Free Languages," 1979, Chapter IV, Section 6 and C. Allauzen, M. Mohri, "An Optimal Pre-determinization Algorithm for Weighted Transducers," Theoretical Computer Science, 2004, Volume 328, Issue 1-2, Implementation and application of automata, Pages 3-18).

It is assumed that a set of paths which reaches a state q' from a state q by an input symbol w is $\Pi(q,w,q')$, and the state of a transition destination of a path $\pi$ is n($\pi$). When ($\times$) is a conjunction operation of a symbol sequence, and a symbol sequence is x, it is assumed that $x^{-1}$ is a symbol sequence which satisfies $x^{-1}(\times)x = \epsilon$. For example, $A(\times)B = AB$ and $A^{-1}(\times)AB = B$ are established.

(Condition)

$$out(\pi_1)^{-1}(\times)out(\pi_2) = out(\pi_1\pi'_1)^{-1}(\times)out(\pi_2\pi'_2)$$

When this condition is satisfied, this means that the states $q_1 = n(\pi_1)$ and $q_2 = n(\pi_2)$ are twins. Paths from initial states $i_1$, $i_2 \in I$ by an input symbol sequence $x \in \Sigma^*$ are $\pi_1 \in \Pi(i_1,x)$ and $\pi_2 \in \Pi(i_2,x)$. For an input symbol sequence $y \in \Sigma^*$, paths are $\pi'_1 \in \Pi(q_1,y,q_1)$ and $\pi'_2 \in \Pi(q_2,y,q_2)$. A path in which a path $\pi'_1$ is connected behind a path $\pi_1$ is expressed by $\pi_1\pi'_1$. When all combinations of $q_1$ and $q_2$ are twins, this means that the FST has a twins property. In the case of an FST with no cyclic path, since $\cup(q_1,y,q_1)$ or $\cup(q_2,y,q_2)$ is an empty set, there is no non-twins state. Thus, this FST also has a twins property.

A method which finds a non-twins state and introduces an auxiliary input symbol into the corresponding location, thereby enabling determinizing, that is, a method which carries out conversion to a single-valued FST is heretofore known ("An Optimal Pre-determinization Algorithm for Weighted Transducers"). An auxiliary input symbol is an input symbol which is not included in an original FST and is newly introduced to form a single-valued FST. With this method, a non-single-valued FST is converted to a single-valued FST in advance, thereby determinizing a non-single-valued FST.

When a twins property is provided, an output symbol may be erased. There is a case illustrated in FIG. 1. A bold-line circle represents an initial state, and a double-line circle represents a final state. The left side of ":" is an input symbol, and the right side of ":" is an output symbol sequence.

Figure 2:
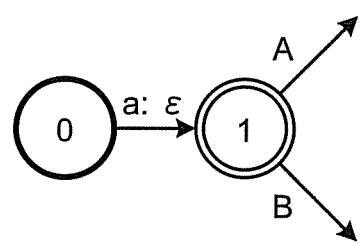
FIG. 2 is a diagram illustrating an example where an output symbol is not erased after determinizing.

In this case, if it is defined such that n outgoing transitions are recognized from the final state, and an output symbol is assigned to each transition (FIG. 2), an output symbol is not erased even after determinizing. This FST is described in U.S. Pat. No. 6,456,971 and "Transductions and Context-Free Languages."

An FST in which each transition is weighted is called a weighted finite state transducer (WFST). Similarly to an FST, determinizing can be performed on a WFST. For example, determinizing can be performed by the method described in U.S. Pat. No. 6,456,971. In the case of a WFST as well, there is a non-single-valued WFST. The determinizing of a non-single-valued WFST requires conversion to a single-valued WFST, and the conversion method is described in "An Optimal Pre-determinization Algorithm for Weighted Transducers." A method is carried out in which a non-single-valued WFST is first converted to a single-valued WFST by the conversion method, and then determinizing is performed, thereby determinizing a non-single-valued WFST.

That is, it is necessary to perform preprocessing, which includes a step of finding a portion responsible for a non-single value and a step of converting the found portion to a single value to construct a single-valued NFST. In the following embodiments, a case will be described where a non-single-valued NFST is determinized without preprocessing.

Next, necessary symbols, terms, and the like in this embodiment or subsequent embodiments will be described.

An empty set is expressed by $\phi$ or $\{\ \}$. An empty symbol sequence is expressed by $\epsilon$. An empty symbol sequence is also called an empty sequence or an empty string. The transition source state of a transition $e \in E$ is p(e), the transition destination state of the transition $e \in E$ is n(e), an input symbol is in(e), and an output symbol sequence is out(e). Similarly, the starting state of a path $\pi \in E^*$ is p($\pi$), the ending state of the path $\pi \in E^*$ is n($\pi$), an input symbol sequence is in($\pi$), and an output symbol sequence is out($\pi$). The total number of transitions on a path $\pi$ is $|\pi|$. The state of a j-th transition destination on $\pi$ is $(\pi)_j$. $p(\pi) = (\pi)_0$ and $n(\pi) = (\pi)_{|\pi|}$. It is assumed that an auxiliary input symbol is expressed by $\#_n$ (where n is an integer). It is desirable that a plurality of auxiliary input symbols can be distinguished from each other, thus it is assumed that n of $\#_n$ is an integer.

When a set is expressed by a program or the like, a set may be expressed in any way insofar as elements of a set can be stored, and overlapping elements are not generated in the set. For example, an array, a linked list, a binary tree, a hash table, or the like may be used.

According to the method in this embodiment, it is not possible to determinize all FST having no twins property. Only an NFST which satisfies the following condition can be determinized by the method in this embodiment.

It is assumed that paths from an initial state to states $q_1$ and $q_2$ are respectively $\pi_1$ and $\pi_2$, a path from the state $q_1$ to $q_1$ is $\pi'_1$, a path from the state $q_2$ to $q_2$ is $\pi'_2$, and in($\pi_1\pi'_1$) = in($\pi_2\pi'_2$). When all the states $q_1$ and $q_2$ are twins or satisfy the following condition, determinizing can be performed with conversion to a single value by the method in this embodiment.

This condition is that, if there is j such that $(\pi_1)_j=(\pi_2)_j$, and all output symbol sequences of transitions on $\pi_1$ and $\pi_2$ to states $(\pi_1)_j$ and $(\pi_2)_j$ are assumed as $\epsilon$, the states $q_1$ and $q_2$ become twins.

Since an NFST which does not satisfy the above condition cannot be converted to a single value, there is no case where determinizing processing by the method in this embodiment is completed.

The details of the method in this embodiment are as pseudo codes of FIGS. 3A and 3B. A pseudo code illustrated in FIG. 3B is a pseudo code subsequent to FIG. 3A, and the pseudo codes are combined to form a single function "determinize." The pseudo code can determinize an FST with an initial output and a final output to the FST. Incidentally, the final output is a single output symbol sequence. A method of processing an FST with no initial output, an FST with a plurality of final outputs, or an FST with no final output will be described below. It is assumed that an FST which is subjected to determinizing by the pseudo code is $T_1=(Q_1,\Sigma_1,\Delta,E_1,I_1,F_1,\lambda_1,\rho_1)$, and an FST after determinizing is $T_2=(Q_2,\Sigma_2,\Delta,E_2,i_2,F_2,\lambda_2,\rho_2)$. $Q_1$ and $Q_2$ are sets of states, $\Sigma_1$ and $\Sigma_2$ are sets of input symbols, $\Delta$ is a set of output symbols, $E_1$ and $E_2$ are sets of transitions, $I_1$ is a set of initial states, $i_2$ is an initial state, $\lambda_1$ is an initial output function, $\lambda_2$ is an initial output, and $\rho_1$ and $\rho_2$ are final output functions. For an initial state $i \in I$, $\lambda_1(i) \in \Delta^*$ and $\lambda_2 \in \Delta^*$. With regard to a final state $q \in F_1$, $\rho_1(q) \in \Delta^*$. Similarly, with regard to $q \in F_2$, $\rho_2(q) \in \Delta^*$.

From the viewpoint of generalization, an operation of an output symbol is expressed by (+) and (×). In the drawings, (+) is a symbol with + enclosed in a circle, and (×) is a symbol with × enclosed in a circle. In this embodiment, (+) represents a longest common prefix operation, and (×) represents a conjunction operation. For example, abc(+)adc=a and a(×)b=ab. $1^\#$ is further introduced. In this embodiment, $1^\#$ is handled as an empty symbol sequence $\epsilon$. In other words, in this embodiment, even when $1^\#$ of FIG. 3 is substituted with $\epsilon$, the meaning is the same. When a symbol sequence is x, it is assumed that $x^{-1}$ is a symbol sequence such that the condition $x^{-1}(\times)x=1^\#=\epsilon$ is satisfied. For example, $a^{-1}(\times)ab=b$. aux(q,v) represents an auxiliary input symbol which corresponds to an output symbol $v \in \Delta^*$ and a state $q \in Q_2$. The details of aux(q,v) will be described below.

When a state which is an element of a set $Q_2$ of states of $T_2$ is $q_2$, $q_2$ is expressed by a set of two-tuples (state of $T_1$ and input symbol or output symbol sequence). Formally, $q_2 \subseteq \{(q_1,w)|q_1 \in Q_1, w \in (\Sigma_1 \cup \Delta^*)\}$. At the time of actual operation on a computer, as the pseudo code of FIG. 3, a set of two-tuples may be used to distinguish between the states of $T_2$, or numbers may be assigned to the states of $T_2$ and may be stored in association with the set of two-tuples. If determinizing is completed, since a set of two-tuples are not necessary, only information for distinguishing between the states may be included in the states. For example, different numbers may be assigned to the states of $T_2$.

$\gamma(q_2,\alpha)$ and $\xi(q_2,\alpha,q_n)$ which are used in FIG. 3 are defined as follows.

$$\gamma(q_2,\alpha)=\{n(e)|e \in E_1,(q,\bullet) \in q_2, p(e)=q, in(e)=\alpha\}$$

$$\xi(q_2,\alpha,q_n)=\{(w,e)|(q,w) \in q_2, e \in E_1, p(e)=q, n(e)=q_n, in(e)=\alpha\}$$

$\gamma(q_2,\alpha)$ represents a set of states of a transition destination by an input symbol $\alpha$ from each state before determinizing as an element of the state $q_2$ after determinizing. $\xi(q_2,\alpha,q_n)$ represents a set of transitions in which the state before determinizing as an element of the state $q_2$ after determinizing is a transition source state, and a state $q_n \in Q_1$ before determinizing is a transition destination, and to which the input symbol $\alpha$ is assigned.

The pseudo code of FIG. 3 will be described. In this embodiment, one step is carried out for each processing corresponding to one row of the pseudo code. In the 1st row, a set $Q_2$ of states of FST $T_2$, a set $E_2$ of transitions, and a set $F_2$ of final states are initialized as an empty set. A set $\Sigma_1$ of input symbols of FST $T_1$ is substituted for a set $\Sigma_2$ of input symbols.

In the 2nd row, the result of a longest common prefix operation on all output symbol sequences assigned to the initial states of FST $T_1$ is substituted in an initial output symbol sequence $\lambda_2$ of FST $T_2$.

In the 3rd row, an initial state $i_2$ of $T_2$ is created. An initial state is expressed as a set which has two-tuples of the initial state of $T_1$ and the output symbol sequence as elements. If an element included in $i_2$ is (i,w), w is obtained by removing the same output symbol sequence as $\lambda_2$ in order from the front of an initial output symbol sequence $\lambda_1(i)$ corresponding to the initial state i of $T_1$. For example, $\lambda_1(i)$ is abc, and $\lambda_2$ becomes $w=(ab)^{-1}(\times)abc=c$ from ab.

In the 4th row, the initial state of $T_2$ is set in the stack S. At this time, an element included in S is $i_2$ only. With regard to the stack S, any structure may be used insofar as values can be added or extracted one by one. Thus, for example, a queue may be mounted, instead of a stack. And, $i_2$ is added to $Q_2$.

In the 5th row, it is determined whether or not the stack S is empty. If the stack S is empty, this means that determinizing is completed, thus the processing ends. When the stack S is not empty, the processing of the 6th or subsequent row is performed.

In the 6th row, one element is extracted from the stack S and substituted in $q_2$. The extracted element is removed from the stack S.

In the 7th row, if at least one symbol sequence from among two-tuples (states and symbol sequences) as elements included in $q_2$ is included in $\Sigma_1$, the processing progresses to the 8th row. Otherwise, the processing progresses to the 14th row.

In the 8th row, let a two-tuple as the element included in $q_2$ be (q,w). Further, since surely $|q_2|=1$, q,w is determined uniquely.

In the 9th row, a transition destination state $q_{n2}$ of a transition which will be created in the 10th row is created. The state $q_{n2}$ becomes a set of two-tuples of a state q and an output symbol sequence $1^\#$ as elements.

In the 10th row, a transition in which a transition source state is $q_2$, an input symbol is w, an output symbol is $1^\#$, and a transition destination state is $q_{n2}$ is added to $E_2$.

In the 11th row, it is determined whether or not $q_{n2}$ is already included in $Q_2$, and if $q_{n2}$ is not yet included in $Q_2$, the processing progresses to the 12th row. In the 12th row, $q_{n2}$ is added to the stack S. $q_{n2}$ is also added to $Q_2$.

In the 14th row to the 23rd row, a final state and a final output of $T_2$ are created.

In the 14th row, it is determined whether or not at least one of states $q \in Q_1$ included in the two-tuples as the elements of $q_2$ is included in a final state $F_1$. If at least one is included, the processing progresses to the 15th row.

In the 15th row, $w(\times)\rho_1(q)$ is calculated for all the two-tuples (q,w) satisfying $q \in F_1$ from among the two tuples (q,w) included in $q_2$. Let a set including all output symbol sequences obtained by the calculation be W.

In the 16th row, an operation by (+) is carried out on all the output symbol sequences included in a set W of output symbol sequences, and the result is substituted in $w_2$. For example, if $W=\{x_1,x_2,x_3\}$, calculation $x_1(+)x_2(+)x_3$ is carried out.

In the 17th row, if at least one output symbol sequence which is the same as $w_2$ calculated in the 16th row is included, the processing progresses to the 18th row. Otherwise, the processing progresses to the 19th row.

In the 18th row, $w_2$ is substituted in $\rho_2(q_2)$ as a final output of $q_2$, and $q_2$ is also added to $F_2$ as a final state.

The 19th row shows that the processing from the 20th row to the 23rd row is performed on an output symbol sequence different from $w_2$ from among the output symbol sequences w included in W.

In the 20th row, the state $q_{n2}$ becomes an empty set.

In the 21st row, a transition in which a transition source state is $q_2$, an input symbol is $(q_{n2},w)$, an output symbol sequence is w, and a transition destination state is $q_{n2}$ is added to $E_2$. An input symbol of the added transition is added to $\Sigma_2$.

In the 22nd row, it is determined whether or not $q_{n2}$ is included in the set $Q_2$ of states of $T_2$. If $q_{n2}$ is included, the processing progresses to the 23rd row.

In the 23rd row, a final output $\rho_2(q_{n2})$ of $q_{n2}$ is $1^{\#}$, and $q_{n2}$ is added to the set $Q_2$ of states of $T_2$ and the set $F_2$ of final states.

The 24th row shows that the processing from the 25th row to the 37th row is performed on the input symbol $\alpha$ included in $\Sigma_1$. It should suffice that the processing from the 25th row to the 37th row is performed on all the input symbols assigned to the transitions in which the state of $T_1$ included in $q_2$ as the two-tuple (state of $T_1$ and output symbol sequence) is a transition source state. Thus, it is not necessary to perform the processing from the 25th row to the 37th row on other input symbols. However, even when the processing is performed, since none satisfies the condition of the 26th row or the 32nd row, the result is the same as when the processing is not performed.

In the 25th row, the following processing is performed on the elements $q_n$ of $\gamma(q_2,\alpha)$ to create a two-tuple ($q_n$ and a set of output symbol sequences) on the basis of $q_n$ and the obtained result, and a set of two-tuples ($q_n$ and a set of output symbol sequences) corresponding to all $q_n$ is substituted in $\theta$. This processing refers to processing for creating a set having the calculation results of w(×)out(e) on the elements (w,e) of $\tau(q_2,\alpha,q_n)$ as elements when w is an output symbol sequence and e is a transition.

In the 26th row, the processing from the 27th row to the 31st row is performed on elements having the size of W equal to or greater than 2 from among the two-tuples ($q_n$,W) as the elements of $\theta$ created in the 25th row.

In the 27th row, a two-tuple ($q_n,\alpha$) is substituted in $q_{n2}$.

The 28th row shows that the processing of the 29th row is performed on the elements w included in W.

In the 29th row, a transition in which a transition source state is $q_2$, an input symbol is aux($q_{n2}$,w), an output symbol sequence is w, and a transition destination state is $q_{n2}$ is added to $E_2$. An input symbol of the added transition is added to $\Sigma_2$.

In the 30th row, it is determined whether or not $q_{n2}$ is included in $Q_2$, and if $q_{n2}$ is not included in $Q_2$, the processing progresses to the 31st row.

In the 31st row, $q_{n2}$ is added to the stack S. And, $q_{n2}$ is also added to $Q_2$.

In the 32nd row, if there is at least one having the size of W equal to 1 from among the two-tuples ($q_n$,W) as the elements of $\theta$, the processing from the 33rd row to the 37th row is performed.

In the 33rd row, an output symbol sequence w∈W is calculated by (+) for all having the size of W equal to 1 from among the two-tuples ($q_n$,W) as the elements of $\theta$, and the obtained result is substituted in $w_2$. For example, when $\theta=\{(r_1,\{ab\}),(r_2,\{ac\}),(r_3,\{b,cd\})\}$ as $r_1,r_2,r_3 \in Q_1$, the two-tuples having the size of W equal to 1 are $(r_1,\{ab\})$ and $(r_2,\{ac\})$, and if the output symbol sequences are calculated by (+), ab(+)ac=a, such that $w_2$=a.

In the 34th row, similarly to the 33rd row, for the two-tuples ($q_n$,W) having the size of W equal to 1 of $\theta$, two-tuples which are constituted by $q_n$ and output symbol sequences with portions corresponding to $w_2$ removed from the front of the elements w of W are created, and the set of two-tuples is substituted in $q_{n2}$. Description will be provided using the example of the 33rd row. Similarly to the 33rd row, since the two-tuples having the size of W equal to 1 are $(r_1,\{ab\})$ and $(r_2,\{ac\})$, $a^{-1}(\times)ab=b$ for $r_1$, and $a^{-1}(\times)ac=c$ for $r_2$. As a result, in this example, $q_{n2}=\{(r_1,b),(r_2,c)\}$.

In the 35th row, a transition in which a transition source state is $q_2$, an input symbol is $\alpha$, an output symbol is $w_2$, and a transition destination state is $q_{n2}$ is added to $E_2$.

In the 36th row, it is determined whether or not $q_{n2}$ is included in $Q_2$, and if $q_{n2}$ is not included in $Q_2$, the processing of the 37th row is performed.

In the 37th row, $q_{n2}$ is added to the stack S. And, $q_{n2}$ is also added to $Q_2$.

If determinizing is completed, it is not necessary to store a set of two-tuples (state and symbol sequence) associated with respective states. Thus, processing may be performed for reassigning different numbers to the states. A number may be assigned as needed during determinizing, and a set of two-tuples (state and symbol sequence) may be associated with the number.

It is desirable that an algorithm aux which uses the state q∈$Q_2$ after determinizing and the output symbol sequence v∈$\Delta^*$ as arguments and returns an auxiliary input symbol as a return value can assign different auxiliary input symbols to two-tuples constituted by q and v.

It is assumed that an auxiliary input symbol is y, and a set having three-tuples (q,v,y) as elements is Y and initialized as an empty set before determinizing. Then, the algorithm aux can be realized by a procedure of FIG. 4.

If a number n is delivered as an argument, make_aux performs processing for returning an auxiliary input symbol $\#_n$.

Figures 4, 5:
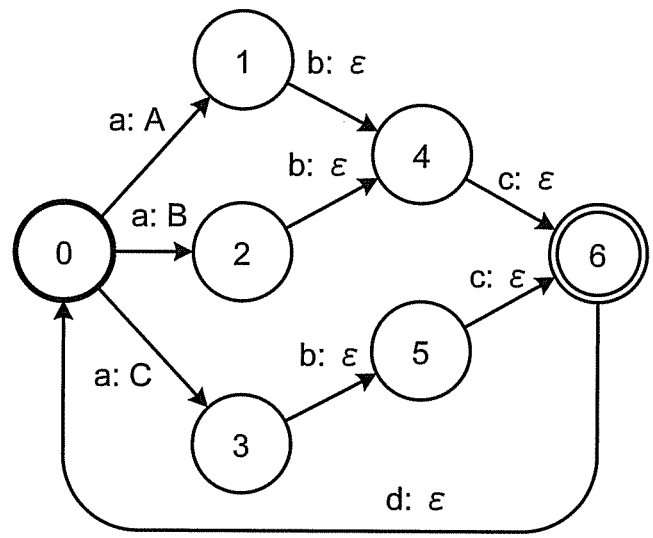
FIG. 4 is a pseudo code of processing for assigning an auxiliary input symbol.
FIG. 5 is a diagram illustrating an FST $T_1$ before determinizing in Example 1.

An operation example of the pseudo code of FIG. 4 is described as follows. For simplification of description, it is assumed that a state of an FST after determinizing is simply expressed by a number. When Y is an empty set, if aux(1,B) is called, there is no case where the condition of the 1st row is satisfied because Y is an empty set. Thus, the processing progresses to the 3rd row. In the 3rd row, make_aux(1) is called. This is because |Y|=0. When this happens, an auxiliary input symbol $\#_1$ is obtained and substituted in y. In the 4th row, $(1,B,\#_1)$ is added to Y, and in the 5th row, the obtained $\#_1$ is returned.

If aux(1,B) is called again, since Y=$\{(1,B,\#_1)\}$, the condition of the 1st row is satisfied. Thus, in the 2nd row, $\#_1$ which is the 3rd element $y_1$ of the elements of Y satisfying the condition is returned as a result.

Next, if aux(2,B) is called, the condition of the 1st row is not satisfied. This is because elements $q_1$=2 and $v_1$=B are not included in Y. Thus, in the 3rd row, a new auxiliary input symbol is created. Now, since |Y|=1, make_aux(2) is executed, and $\#_2$ is obtained and substituted in y. With the use of this, if $(2,B,\#_2)$ is added to Y, Y=$\{(1,B,\#_1),(2,B,\#_2)\}$. Then, $\#_2$ is returned as a result.

In the above-described manner, it is possible to assign different auxiliary input symbols to the combinations of the states q and the output symbol sequences v. It is also possible to create only a necessary number of auxiliary input symbols.

Each time an outgoing transition from the state after determinizing is created for each state, Y may be initialized to an empty set. Specifically, each time the processing from the 6th row to the 37th row of FIG. 3 ends, Y may be initialized to an empty set. Thus, it is possible to suppress the types of auxiliary input symbols to be generated small. This is because, if necessary, an auxiliary input symbol is generated from $\#_1$ for each state after determinizing to be processed. Alternatively, different auxiliary input symbols may be assigned even when the state q and the output symbol sequence v are identical.

Example 1

How the determinizing method of this embodiment operates will be described assuming that an FST of FIG. 5 is FST $T_1$ before determinizing. Similarly to FIG. 3, let an FST after determinizing be $T_2$. In this example, it is assumed that the stack S operates as a stack, that is, in a first-in last-out manner. From FIG. 5, $Q_1=\{0,1,2,3,4,5,6\}$, $I_1=\{0\}$, $F_1=\{6\}$, $\Sigma_1=\{a,b,c,d\}$, and $\Delta_1=\{A,B,C\}$. A bold-line circle represents an initial state, and a double-line circle represents a final state. Of the labels of respective transitions, the left side of ":" is an input symbol, and the right side of ":" is an output symbol sequence.

In the 1st row of FIG. 3, first, the FST after determinizing is initialized.

Next, in the 2nd row, an initial output is calculated. In this example, the FST has no initial output. In other words, $\lambda_1(0)=1^\#=\epsilon$, that is, an empty symbol sequence is output. Thus, $\lambda_2=\epsilon$.

Figure 6:
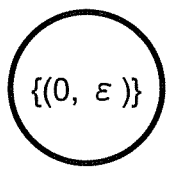
FIG. 6 is a diagram illustrating the initial state of an FST after determinizing in Example 1.

In the 3rd row, the initial state of the FST after determinizing is created. $i_2=\{(0,\epsilon)\}$ (FIG. 6).

In the 4th row, the state $i_2$ created in the 3rd row is added to the stack S and $Q_2$, and as a result, $S=\{\{(0,\epsilon)\}\}$ and $Q_2=\{\{(0,\epsilon)\}\}$.

Since $|S|=1$, the condition of the 5th row is satisfied, and the processing progresses to the 6th row.

In the 6th row, if a value is extracted from the stack S and substituted in $q_2$, $S=\phi$ and $q_2=\{(0,\epsilon)\}$.

In the 7th row, w should be determined only when $w=\epsilon$. Since w is not included in $\Sigma_1$, the condition of the 7th row is not satisfied. Thus, the processing progresses to the 14th row.

In the 14th row, it is determined whether or not a state from among the two-tuples (state and symbol sequence) included in $q_2$ is included in $F_1$. Now, the state included in $q_2$ is the state 0, and the state 0 is not included in $F_1$. Thus, the processing progresses to the 24th row.

Although $\Sigma_1=\{a,b,c\}$, since an input symbol of an outgoing transition from the state 0 is only a, it is desirable to process only $\alpha=a$. Thus, in the 24th row, $\alpha=a$, and the processing of the 25th or subsequent row is performed.

In the 25th row, $\theta=\{(1,\{\epsilon(\times)A\}),(2,\{\epsilon(\times)B\}),(3,\{\epsilon(\times)C\})\}=\{(1,\{A\}),(2,\{B\}),(3,\{C\})\}$.

Since there is no element of $\theta$ which satisfies the condition $|W|>1$ of the 26th row, the processing progresses to the 32nd row.

Since there is an element of $\theta$ which satisfies $|W|=1$, the condition of the 32nd row is satisfied, and the processing progresses to the 33rd row.

In the processing of the 33rd row, $w_2=A(+)B(+)C=\epsilon=1^\#$.

In the processing of the 34th row, $q_{n2}=\{(1,A),(2,B),(3,C)\}$ is obtained. Since $x^{-1}(x)x=\epsilon$, $\epsilon^{-1}=\epsilon$. If $X=\epsilon$, $E^{-1}(x)\epsilon=\epsilon$. Thus, if $\epsilon$ is connected to both sides from the right side by the $(\times)$ operation, $\epsilon^{-1}(x)\epsilon(x)\epsilon=\epsilon(x)\epsilon$, such that $\epsilon^{-1}(x)\epsilon=\epsilon(x)\epsilon$. If $\epsilon$ on the right side is extracted from both sides, modification to $\epsilon^{-1}=\epsilon$ can be made. Thus, for example, (1,A) which is the first element of $q_{n2}$ is obtained by calculating $w_2(\times)A=\epsilon^{-1}(\times)A=\epsilon(\times)A=A$.

Figure 7:
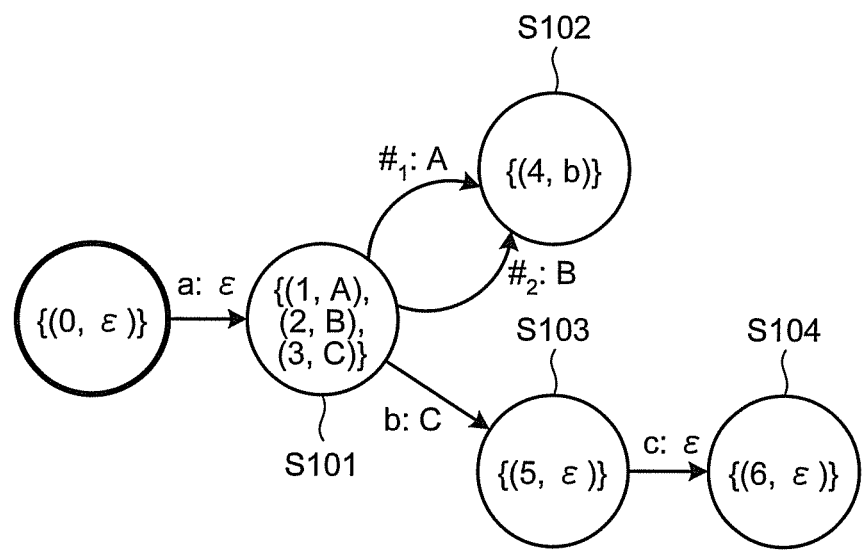
FIG. 7 is a diagram (first view) illustrating an FST during determinizing processing in Example 1.

In the 35th row, a transition in which a transition source state is $\{(0,\epsilon)\}$, an input symbol is a, an output symbol is $\epsilon$, and a transition destination state is $\{(1,A),(2,B),(3,C)\}$ is created and added to $E_2$. As a result, an FST is constituted by the initial state and the state S101 of FIG. 7 and the transition between these states.

Now, since $q_{n2}$ is not included in $Q_2$, the 36th row is satisfied, and the processing of the 37th row is performed.

In the 37th row, since $q_{n2}$ is added to S and $Q_2$, $S=\{\{(1,A),(2,B),(3,C)\}\}$ and $q_2=\{\{(0,\epsilon)\},\{(1,A),(2,B),(3,C)\}\}$.

The processing returns to the 5th row, and since the stack S is not an empty set, the processing progresses to the 6th row.

In the 6th row, $q_2=\{(1,A),(2,B),(3,C)\}$, and $S=\phi$.

Since all of A, B, and C are not included in $\Sigma_1$, the condition of the 7th row is not satisfied, and the processing progresses to the 14th row.

Since the states 1, 2, and 3 are not included in $F_1$, that is, not a final state, the condition of the 14th row is not satisfied. Thus, the processing progresses to the 24th row.

An input symbol of an outgoing transition from the states 1, 2, and 3 is b only. Thus, it is desirable to perform the processing from the 25th row to the 37th row only when $\alpha=b$.

In the 25th row, $\theta=\{(4,\{A(\times)\epsilon,B(\times)\epsilon\}),(5,\{C(\times)\epsilon\})\}=\{(4,\{A,B\}),(5,\{C\})\}$.

In the 26th row, from among the elements of $\theta$, $(4,\{A,B\})$ satisfies the condition $|W|>1$, and the processing from the 27th row to the 31st row is performed on $(4,\{A,B\})$.

In the 27th row, $q_{n2}=\{(q_n,\alpha)\}=\{(4,b)\}$, and the processing progresses to the 28th row.

Now, since $W=\{A,B\}$, first, the processing of the 29th row is performed on w=A. Here, let $aux(q_{n2},w)=aux(\{(4,b)\},A)=\#_1$. Then, in the 29th row, a transition in which a transition source state is $\{(1,A),(2,B),(3,C)\}$, an input symbol is $\#_1$, an output symbol sequence is A, and a transition destination state is $\{(4,b)\}$ is added to $E_2$, and $\#_1$ is also added to $\Sigma_2$. Similarly, the processing is performed on w=B. At this time, if $aux(\{(4,b)\},B)=\#_2$, a transition in which a transition source state is $\{(1,A),(2,B),(3,C)\}$, an input symbol is $\#_2$, an output symbol sequence is B, and a transition destination state is $\{(4,b)\}$ is added to $E_2$, and $\#_2$ is also added to $\Sigma_2$. As a result, an FST is constituted by the initial state, the state S101, and the state S102 of FIG. 7 and the transitions between these states.

In the 30th row, it is determined that $\{(4,b)\}$ is not included in $Q_2$, and in the 31st row, $\{(4,b)\}$ is added to S and $Q_2$. As a result, $S=\{\{(4,b)\}\}$ and $Q_2=\{\{(0,\epsilon)\},\{(1,A),(2,B),(3,C)\},\{(4,b)\}\}$.

Although the processing progresses to the 32nd row, since an element which satisfies $|W|=1$ is included in $\theta$, the condition of the 32nd row is satisfied, and the processing of the 33rd or subsequent row is performed. Here, the element which satisfies the condition is $(5,\{C\})$.

In the 33rd row, $w_2=C$.

In the 34th row, $q_{n2}=\{(5,C^-(\times)C)\}=\{(5,\epsilon)\}$.

In the 35th row, a transition in which a transition source state is $\{(1,A),(2,B),(3,C)\}$, an input symbol is b, an output symbol sequence is C, and a transition destination state is $\{(5,\epsilon)\}$ is added. As a result, an FST is constituted by the initial state, the state S101, the state S102, and the state S103 of FIG. 7 and the transitions between these states.

Since $q_{n2}=\{(5,\epsilon)\}$, the condition of the 36th row is satisfied, and the processing progresses to the 37th row.

In the 37th row, $\{(5,\epsilon)\}$ is added to S and $Q_2$. As a result, $S=\{\{(4,b)\},\{(5,\epsilon)\}\}$ and $Q_2=\{\{(0,\epsilon)\},\{(1,A),(2,B),(3,C)\},\{(4,b)\},\{(5,\epsilon)\}\}$.

Although the processing returns to the 5th row, since S is not an empty set, the processing progresses to the 6th row.

In this example, S is a stack, such that, in the 6th row, $q_2=\{(5,\epsilon)\}$. And, $S=\{\{(4,b)\}\}$.

Since a symbol sequence included in $q_2$ is $\epsilon$ only, the condition of the 7th row is not satisfied. For this reason, the processing progresses to the 14th row.

Since the state 5 is not a final state, the condition of the 14th row is not satisfied, and the processing progresses to the 24th row.

Since $\alpha$ which should be processed in the 25th or subsequent row is c only, let $\alpha=c$.

In the 25th row, $\theta=\{(6,\{\epsilon(\times)\epsilon)\}=\{(6,\{\epsilon\})\}$.

Since there is no element of $\theta$ which satisfies the 26th row, the processing progresses to the 32nd row.

The number of elements of $\theta$ is 1, and with regard to the corresponding element, $W=\{\epsilon\}$. For this reason, $|W|=1$, and the condition of the 32nd row is satisfied. Thus, the processing progresses to the 33rd or subsequent row.

In the 33rd row, $w_2=\epsilon$.

In the 34th row, $q_{n2}=\{(6,\epsilon)\}$.

In the 35th row, a transition in which a transition source state is $\{(5,\epsilon)\}$, an input symbol is c, an output symbol is $\epsilon$, and a transition destination state is $\{(6,\epsilon)\}$ is added to $E_2$. As a result, an FST illustrated in FIG. 7 which includes the state S104 is formed.

Since $q_{n2}=\{(6,\epsilon)\}$, the condition of the 36th row is satisfied, and the processing progresses to the 37th row. In the 37th row, $\{(6,\epsilon)\}$ is added to S and $Q_2$. As a result, $S=\{\{(4,b)\},\{(6,\epsilon)\}\}$ and $Q_2=\{\{(0,\epsilon)\},\{(1,A),(2,B),(3,C)\},\{(4,b)\},\{(5,\epsilon)\},\{(6,\epsilon)\}\}$.

Although the processing returns to the 5th row, since S is not an empty set, the processing progresses to the 6th row.

In the 6th row, $q_2=\{(6,\epsilon)\}$. And, $S=\{\{(4,b)\}\}$.

Since a symbol sequence included in $q_2$ is $\epsilon$ only, the condition of the 7th row is not satisfied. For this reason, the processing progresses to the 14th row.

Since the state 6 is a final state, the condition of the 14th row is satisfied, and the processing progresses to the 15th row.

Since $\rho_1(6)=\epsilon$, in the 15th row, $W=\{\epsilon(\times)\epsilon\}=\{\epsilon\}$.

In the 16th row, $w_2=\epsilon$.

The number of elements of W is 1, and the element is $\epsilon$. For this reason, the condition of the 17th row is satisfied, and the processing progresses to the 18th row.

Figure 8:
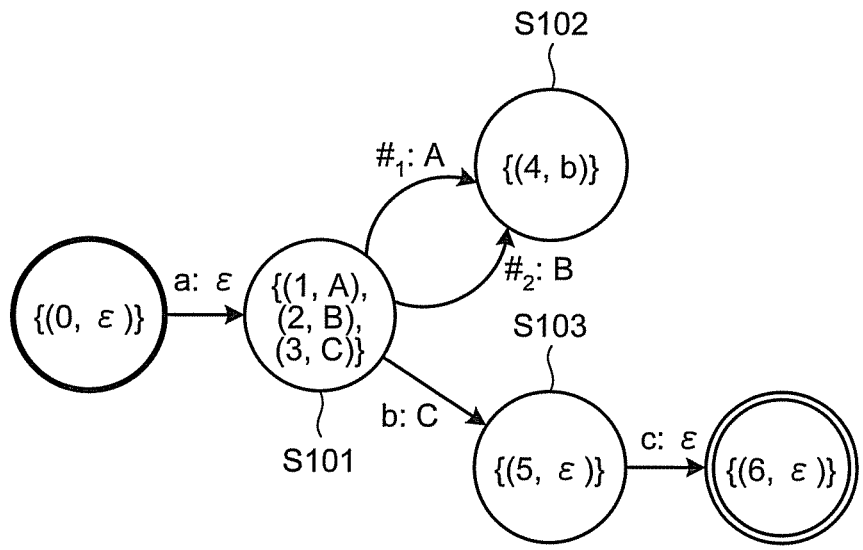
FIG. 8 is a diagram (second view) illustrating an FST during determinizing processing in Example 1.

In the 18th row, $\rho_2(\{(6,\epsilon)\})=\epsilon$ and $F_2=\{\{(6,\epsilon)\}\}$. As a result, it becomes as illustrated in FIG. 8.

Since there is no element of W which satisfies the 19th row, the processing from the 20th row to the 23rd row is not performed, and the processing progresses to the 24th row.

Since $\alpha$ which should be processed in the 25th or subsequent row is d only, let $\alpha=d$.

In the 25th row, $\theta=\{(0,\{\epsilon(\times)\epsilon\})\}=\{(0,\{\epsilon\})\}$.

Since there is no element of $\theta$ which satisfies the 26th row, the processing progresses to the 32nd row.

The number of elements of $\theta$ is 1, and with regard to the corresponding element, $W=\{\epsilon\}$. For this reason, $|W|=1$, and the condition of the 32nd row is satisfied. Thus, the processing progresses to the 33rd or subsequent row.

In the 33rd row, $w_2=\epsilon$.

In the 34th row, $q_{n2}=\{(0,\epsilon)\}$.

In the 35th row, a transition in which a transition source state is $\{(6,\epsilon)\}$, an input symbol is d, an output symbol is $\epsilon$, and a transition destination state is $\{(0,\epsilon)\}$ is added to $E_2$. As a result, an FST is constituted by the state S105 of FIG. 9 and portions excluding the transition to the corresponding state and the transition from the corresponding state.

Since $q_{n2}=\{(0,\epsilon)\}$, the condition of the 36th row is not satisfied, such that the processing of the 37th row is not performed.

Although the processing returns to the 5th row, since S is not empty, the processing progresses to the 6th row.

In the 6th row, $q_2=\{(4,b)\}$. And, $S=\phi$.

Since a symbol sequence included in $q_2$ is b, the condition of the 7th row is satisfied, and the processing progresses to the 8th row.

In the 8th row, q=4 and w=b.

In the 9th row, $q_{n2}=\{(4,1^{\#})\}=\{(4,\epsilon)\}$.

In the 10th row, a transition in which a transition source state is $\{(4,b)\}$, an input symbol is b, an output symbol is $\epsilon$, and a transition destination state is $\{(4,\epsilon)\}$ is added to $E_2$. As a result, an FST is constituted by the portions excluding the outgoing transition from the state S105 of FIG. 9.

Since $q_{n2}=\{(4,\epsilon)\}$, the condition of the 11th row is satisfied, and the processing progresses to the 12th row.

In the 12th row, $\{(4,\epsilon)\}$ is added to S and $Q_2$. As a result, $S=\{\{(4,\epsilon)\}\}$ and $Q_2=\{\{(0,\epsilon)\},\{(1,A),(2,B),(3,C)\},\{(4,b)\},\{(5,\epsilon)\},\{(6,\epsilon)\},\{(4,\epsilon)\}\}$.

Although the processing returns to the 5th row, since S is not empty, the processing progresses to the 6th row.

In the 6th row, $q_2=\{(4,\epsilon)\}$. And, $S=\phi$.

Since a symbol sequence included in $q_2$ is $\epsilon$ only, the condition of the 7th row is not satisfied. For this reason, the processing progresses to the 14th row.

Since the state 4 is not a final state, the condition of the 14th row is not satisfied, and the processing progresses to the 24th row.

Since $\alpha$ which should be processed in the 25th or subsequent row is c only, let $\alpha=c$.

In the 25th row, $\theta=\{(6,\{\epsilon(\times)\epsilon\})\}=\{(6,\{\epsilon\})\}$.

Since there is no element of $\theta$ which satisfies the 26th row, the processing progresses to the 32nd row.

The number of elements of $\theta$ is 1, and with regard to the corresponding element, $W=\{\epsilon\}$. For this reason, $|W|=1$, and the condition of the 32nd row is satisfied. Thus, the processing progresses to the 33rd or subsequent row.

In the 33rd row, $w_2=\epsilon$.

In the 34th row, $q_{n2}=\{(6,\epsilon)\}$.

Figure 9:
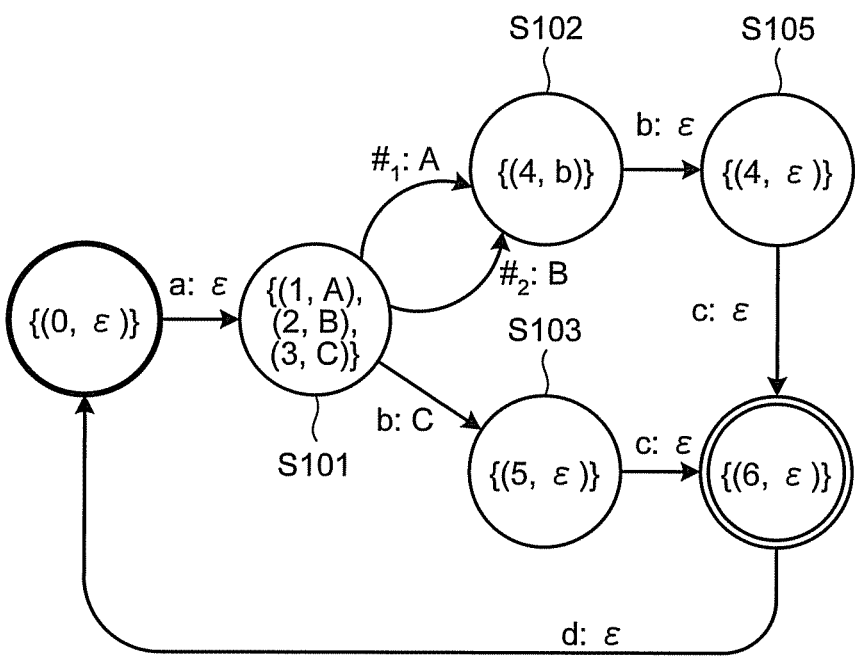
FIG. 9 is a diagram (third view) illustrating an FST during determinizing processing in Example 1.

In the 35th row, a transition in which a transition source state is $\{(4,\epsilon)\}$, an input symbol is c, an output symbol is $\epsilon$, and a transition destination state is $\{(6,\epsilon)\}$ is added to $E_2$. As a result, it becomes as illustrated in FIG. 9.

Since $q_{n2}=\{(6,\epsilon)\}$, the condition of the 36th row is not satisfied, and the processing of the 37th row is not performed.

Although the processing returns to the 5th row, now, since S is an empty set, the condition of the 5th row is not satisfied. Thus, the determinizing processing is completed.

Figure 10:
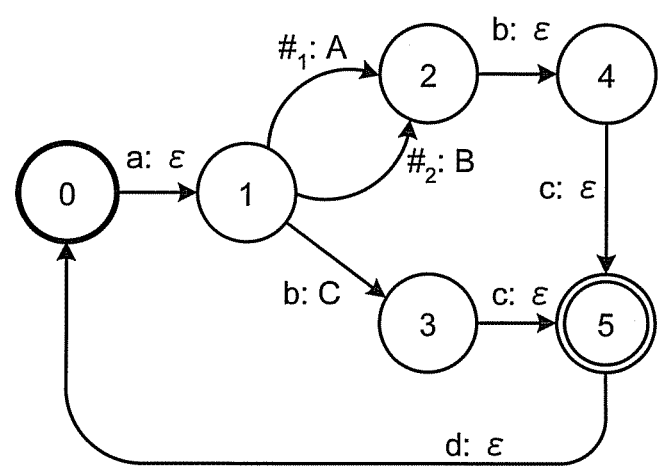
FIG. 10 is a diagram illustrating an FST after determinizing in Example 1.

A set of two-tuples associated with the states may be substituted with numbers and may be as illustrated in FIG. 10.

Example 2

Figure 11:
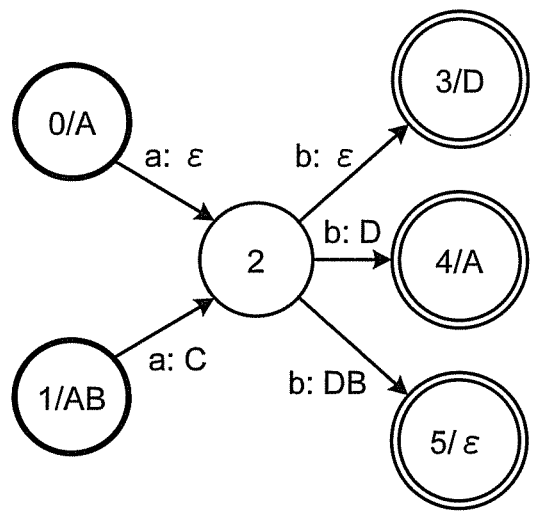
FIG. 11 is a diagram illustrating an FST $T_1$ before determinizing in Example 2.

How the determinizing method of this embodiment operates when there are a plurality of initial states or final states will be described assuming that the FST of FIG. 11 is FST $T_1$ before determinizing.

Similarly to FIG. 3, let an FST after determinizing be $T_2$. In this example, it is assumed that the stack S operates as a stack, that is, in a first-in last-out manner. From FIG. 11, $Q_1=\{0,1,2,3,4,5\}$, $I=\{0,1\}$, $F=\{3,4,5\}$, $\Sigma_1=\{a,b\}$, $\Delta_1=\{A,B,C,D\}$, $\lambda_1(0)=A, \lambda_1(1)=AB, \rho_1(3)=D, \rho_1(4)=A,$ and $\rho_1(5)=\epsilon$. The left side of/described in an initial state and a final state is a state number, and the right side of/is an initial output symbol and a final output symbol.

In the 1st row of FIG. 3, first, the FST after determinizing is initialized.

Next, in the 2nd row, an initial output is calculated. $\lambda_2=\lambda_1(0)(+)\lambda_1(1)=A(+)AB=A$.

Figure 12:
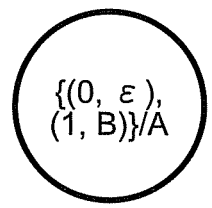
FIG. 12 is a diagram illustrating the initial state of an FST after determinizing in Example 2.

In the 3rd row, an initial state of the FST after determinizing is created. $i_2=\{(0,A^{-1}(\times)A),(1,A^{-1}(\times)AB)\}=\{(0,\epsilon),(1,B)\}$ (FIG. 12).

In the 4th row, the state $i_2$ created in the 3rd row is added to the stack S and $Q_2$, and as a result, $S=\{\{(0,\epsilon),(1,B)\}\}$ and $Q_2=\{\{(0,\epsilon),(1,B)\}\}$.

Since $|S|=1$, the condition of the 5th row is satisfied, and the processing progresses to the 6th row.

In the 6th row, if a value is extracted from the stack S and substituted in $q_2$, $S=\phi$ and $q_2=\{(0,\epsilon),(1,B)\}$.

In the 7th row, symbol sequences corresponding to w which should be determined are $\epsilon$ and B. Since all of them are not included in $\Sigma_1$, the condition of the 7th row is not satisfied. Thus, the processing progresses to the 14th row.

In the 14th row, it is determined whether or not a state from among the two-tuples (state and symbol sequence) included in $q_2$ is included in the $F_1$. Now, although the states included in the $q_2$ are the state 0 and the state 1, these states are not included in $F_1$. Thus, the processing progresses to the 24th row.

Although $\Sigma_1=\{a,b\}$, since an input symbol of an outgoing transition from the state 0 and the state 1 is a only, it is desirable to perform processing only $\alpha=a$. Thus, in the 24th row, $\alpha=a$, and the processing of the 25th or subsequent row is performed.

In the 25th row, $\theta=\{(2,\{\epsilon(\times)\epsilon,B(\times)C\})\}=\{(2,\{\epsilon,BC\})\}$.

In the 26th row, since $(2,\{\epsilon,BC\})$ from among the elements of $\theta$ satisfies the condition $|W|>1$, the processing from the 27th row to the 31st row is performed on $(2,\{\epsilon,BC\})$.

In the 27th row, $q_{n2}=\{(q_n,\alpha)\}=\{(2,\alpha)\}$, and the processing progresses to the 28th row.

Now, since $W=\{\epsilon,BC\}$, first, with regard to $w=\epsilon$, the processing of the 29th row is performed. Here, it is assumed that $aux(q_{n2},w)=aux(\{(2,a)\},\epsilon)=\#_1$. Then, in the 29th row, a transition in which a transition source state is $\{(0,\epsilon),(1,B)\}$, an input symbol is $\#_1$, an output symbol sequence is $\epsilon$, and a transition destination state is $\{(2,a)\}$ is added to $E_2$, and $\#_1$ is also added to $\Sigma_2$. Similarly, with regard to $w=BC$, the processing is performed. At this time, if $aux(\{(2,a)\},BC)=\#_2$, a transition in which a transition source state is $\{(0,\epsilon),(1,B)\}$, an input symbol is $\#_2$, an output symbol sequence is BC, and a transition destination state is $\{(2,a)\}$ is added to $E_2$, and $\#_2$ is also added to $\Sigma_2$. As a result, an FST is constituted by the initial state and the state S201 of FIG. 13 and the transitions between these states.

In the 30th row, it is determined that $\{(2,a)\}$ is not included in $Q_2$, and in the 31st row, $\{(2,a)\}$ is added to S and $Q_2$. As a result, $S=\{\{(2,a)\}\}$ and $Q_2=\{\{(0,\epsilon),(1,B)\},\{(2,a)\}\}$.

Although the processing progresses to the 32nd row, since no element which satisfies $|W|=1$ is not included in $\theta$, the condition of the 32nd row is not satisfied. Thus, the processing of the 33rd or subsequent row is not performed, and processing returns to the 5th row.

Since S is not an empty set, the processing progresses to the 6th row.

In the 6th row, $q_2=\{(2,a)\}$. And, $S=\phi$.

Since a symbol sequence included in $q_2$ is a, the condition of the 7th row is satisfied, and the processing progresses to the 8th row.

In the 8th row, $q=2$ and $w=a$.

In the 9th row, $q_{n2}=\{(2,1^\#)\}=\{(2,\epsilon)\}$.

In the 10th row, a transition in which a transition source state is $\{(2,a)\}$, an input symbol is a, an output symbol sequence is $\epsilon$, and a transition destination state is $\{(2,\epsilon)\}$ is added to $E_2$. As a result, an FST is constituted by the initial state, the state S201, and the state S202 of FIG. 13 and the transitions between these states.

Since $q_{n2}=\{(2,\epsilon)\}$, the condition of the 11th row is satisfied, and the processing progresses to the 12th row.

In the 12th row, $\{(2,\epsilon)\}$ is added to S and $Q_2$. As a result, $S=\{\{(2,\epsilon)\}\}$ and $Q_2=\{\{(0,\epsilon),(1,B)\},\{(2,a)\},\{(2,\epsilon)\}\}$.

Although the processing returns to the 5th row, since S is not empty, the processing progresses to the 6th row.

In the 6th row, $q_2=\{(2,\epsilon)\}$. And, $S=\phi$.

Since a symbol sequence included in $q_2$ is $\epsilon$ only, the condition of the 7th row is not satisfied. For this reason, the processing progresses to the 14th row.

Since the state 2 is not a final state, the condition of the 14th row is not satisfied, and the processing progresses to the 24th row.

Since $\alpha$ which should be processed in the 25th or subsequent row is b only, let $\alpha=b$.

In the 25th row, $\theta=\{(3,\{\epsilon(\times)\epsilon\}),(4,\{\epsilon(\times)D\}),(5,\{\epsilon(\times)DB\})\}=\{(3,\{\epsilon\}),(4,\{D\}),(5,\{DB\})\}$.

Since there is no element of $\theta$ which satisfies the 26th row, the processing progresses to the 32nd row.

The number of elements of $\theta$ is 3, and with regard to these elements, W is $\{\epsilon\}$, $\{D\}$, and $\{DB\}$, and for all of these elements, $|W|=1$. Thus, the condition of the 32nd row is satisfied, and the processing progresses to the 33rd row.

In the 33rd row, $w_2=\epsilon$.

In the 34th row, $q_{n2}=\{(3,\epsilon),(4,D),(5,DB)\}$.

Figure 13:
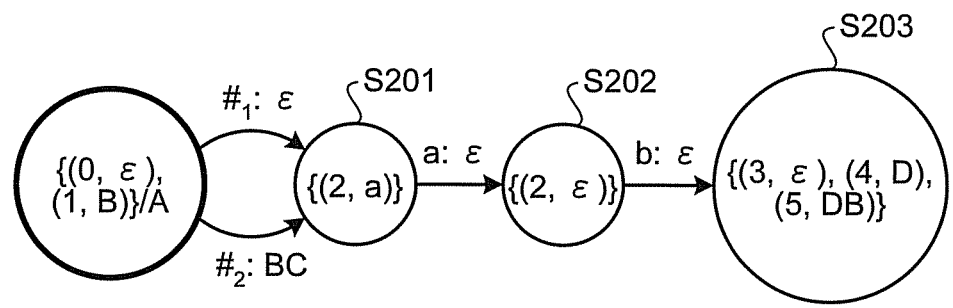
FIG. 13 is a diagram (first view) illustrating an FST during determinizing processing in Example 2.

In the 35th row, a transition in which a transition source state is $\{(2,\epsilon)\}$, an input symbol is b, an output symbol is $\epsilon$, and a transition destination state is $\{(3,\epsilon),(4,D),(5,DB)\}$ is added to $E_2$. As a result, an FST of FIG. 13 is formed.

Since $q_{n2}=\{(3,\epsilon),(4,D),(5,DB)\}$, the condition of the 36th row is satisfied, and the processing progresses to the 37th row. In the 37th row, $\{(3,\epsilon),(4,D),(5,DB)\}$ is added to S and $Q_2$. As a result, $S=\{\{(3,\epsilon),(4,D),(5,DB)\}\}$ and $Q_2=\{\{(0,\epsilon),(1,B)\},\{(2,a)\},(2,\epsilon),\{(3,\epsilon),(4,D),(5,DB)\}\}$.

Although the processing returns to the 5th row, since S is not an empty set, the processing progresses to the 6th row.

In the 6th row, $q_2=\{(3,\epsilon),(4,D),(5,DB)\}$. And, $S=\phi$.

Since symbol sequences included in $q_2$ are $\epsilon$, D, and DB, the condition of the 7th row is not satisfied. For this reason, the processing progresses to the 14th row.

Since the states 3, 4, and 5 are final states, the condition of the 14th row is satisfied, and the processing progresses to the 15th row.

Since $\rho_1(3)=D$, $\rho_1(4)=A$, and $\rho_1(5)=\epsilon$, in the 15th row, $W=\{\epsilon(\times)D,D(\times)A,DB(\times)\epsilon\}=\{D,DA,DB\}$.

In the 16th row, $w_2=D(+)DA(+)DB=D$.

Since D is not included in the elements of W, the condition of the 17th row is satisfied, and the processing progresses to the 18th row.

Figure 14:
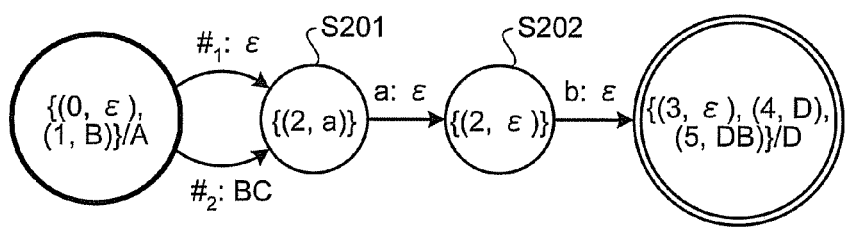
FIG. 14 is a diagram (second view) illustrating an FST during determinizing processing in Example 2.

In the 18th row, $\rho_2(\{(3,\epsilon),(4,D),(5,DB)\})=D$ and $F_2=\{\{(3,\epsilon),(4,D),(5,DB)\}\}$. As a result, it becomes as illustrated in FIG. 14.

Since there is an element of W which satisfies the 19th row, first, with regard to $w=DA$, the processing from the 20th row to the 23rd row is performed.

In the 20th row, let $q_{n2}=\phi$.

If $aux(q_{n2},w)=aux(\phi,DA)=\#_3$, in the 21st row, a transition in which a transition source state is $\{(3,\epsilon),(4,D),(5,DB)\}$, an input symbol is $\#_3$, an output symbol is DA, and a transition destination state is $\phi$ is added to $E_2$.

Since $\phi$ is not included in $Q_2$, the 22nd row is satisfied, and the processing progresses to the 23rd row.

Figure 15:
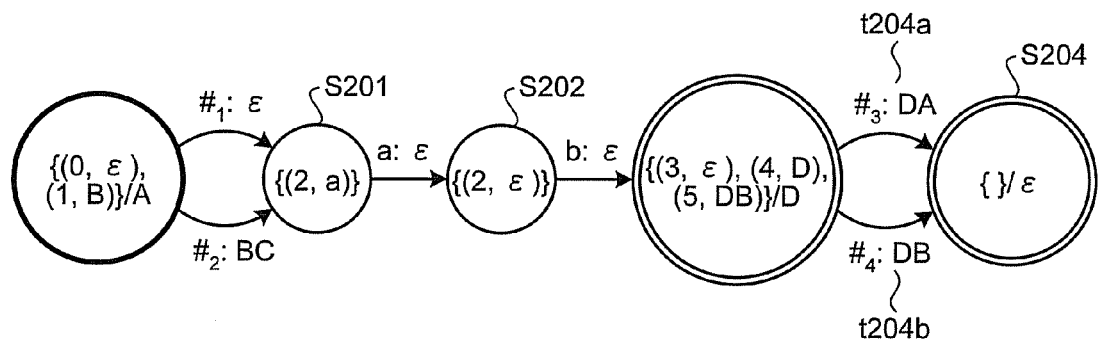
FIG. 15 is a diagram (third view) illustrating an FST during determinizing processing in Example 2.

In the 23rd row, $\rho_2(q_{n2})=\rho_2(\phi)=1^\#=\epsilon$, $Q_2=\{\{(0,\epsilon),(1,B)\}, \{(2,a)\},\{(2,\epsilon)\},\{(3,\epsilon),(4,D),(5,DB)\},\phi\}$, and $F_2=\{\{(3,\epsilon),(4,D),(5,DB)\},\phi\}$. As a result, the state S204 and the transition t204a of FIG. 15 are added to FIG. 14. That is, an FST is constituted by the portions excluding the transition t204b in FIG. 15.

Next, with regard to w=DB, the processing from the 20th row to the 23rd row is performed.

In the 20th row, let $q_{n2}=\phi$.

If $aux(q_{n2},w)=aux(\phi,DB)=\#_4$, in the 21st row, a transition in which a transition source state is $\{(3,\epsilon),(4,D),(5,DB)\}$, an input symbol is $\#_4$, an output symbol is DB, and a transition destination state is $\phi$ is added to $E_2$. Referring to FIG. 15, the transition t204b is added. As a result, an FST of FIG. 15 is formed.

Now, since $\phi$ is included in $Q_2$, the 22nd row is not satisfied.

Since the processing ends on all the elements of W, not $w_2$, the processing progresses to the 24th row.

Since there is no outgoing transition from the states 3, 4, and 5, even when the processing of the 24th or subsequent row is performed, nothing occurs.

Although the processing returns to the 5th row, now, since S is an empty set, the condition of the 5th row is not satisfied. Thus, the determinizing processing is completed.

Figures 16, 17:
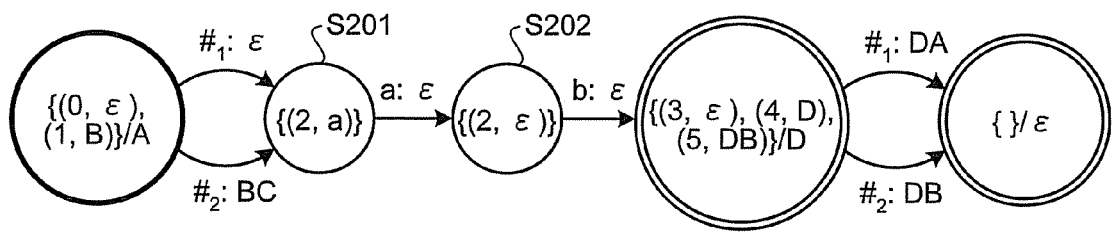
FIG. 16 is a diagram illustrating an FST after determinizing in Example 2.
FIG. 17 is a pseudo code of an example where an FST with no final output is processed.

As described above, the number (n of $\#_n$) of an auxiliary input symbol can be assigned to each state starting from 1. In this case, an FST after determinizing is as illustrated in FIG. 16.

(Processing of FST with No Initial Output)

When an FST with no initial output is used, it is considered that an initial output of an NFST to be determinized is $\epsilon$. Thus, in the 2nd row of FIG. 3, $\lambda_2=\epsilon$. That is, a DFST after determinizing becomes a DFST with no initial output. Therefore, if all the initial outputs assigned to the initial states before determinizing are set to $\epsilon$, the processing for determinizing a DFST with no initial output from an NFST with no initial output can be performed by the method of FIG. 3.

(Processing of FST with No Final Output)

When determinizing regarding an FST with no final output, that is, an FST with p undefined is performed, the 15th row to the 23rd row in the method of FIG. 3 may be changed as illustrated in FIG. 17.

Since there is no final output of an FST before determinizing, W is constituted by symbol sequences, which form a tuple along with the states included in $F_1$, from among the two-tuples (state and symbol sequence) included in the $q_2$. However, a symbol sequence $1^\#$ is not included (the 1st row of FIG. 17).

If W is an empty set (the 2nd row of FIG. 17), in the 3rd row, $q_2$ is added to $F_2$.

Although the processing from the 5th row to the 8th row of FIG. 17 is performed on all the elements of W, the operations from the 5th row to the 7th row are the same as the 20th row to the 22nd row of FIG. 3. In the 8th row of FIG. 17, processing is performed for adding $q_{n2}$ to $Q_2$ and $F_2$.

In summary, when a final output is not necessary, $q_2$ is simply set as a final state. Otherwise, a final state is newly created, a transition in which the corresponding state is a transition destination state, and $q_2$ is a transition source state is created, and w is assigned to the output symbol sequence of the corresponding transition.

(Processing of FST which May have N Final Outputs)

In the case of an FST in which N (N≥0) final outputs can be assigned to each final state to the maximum, final outputs $\rho(q)$ which is assigned to a state q becomes a set of output symbol sequences. However, it is assumed that $|\rho(q)|\leq N$ is satisfied. When $\rho(q)=\phi$, there is no final output of the state q. When determinizing regarding this FST is performed, the 15th row to the 23rd row in the method of FIG. 3 may be changed as illustrated in FIG. 18.

In the 1st row of FIG. 18, $q_2$ is added to $F_2$.

In the 2nd row, a list of final outputs is created. For all the two-tuples, in which the state q is the final state of the FST before determinizing, from among the two-tuples (state q and symbol sequence w) included in $q_2$, $x=w(\times)y$ is calculated from the final output y assigned to the symbol sequence w and the state q. Of these, let a set of symbol sequences which are constituted by x not equal to $1^\#$ be W.

In the 3rd row, it is determined whether or not the size of W is greater than N. When the size of W is greater than N, the processing progresses to the 4th row. Otherwise, the processing progresses to the 11th row. This is because, when the size of W is greater than N, all the final outputs included in W cannot be assigned to the final outputs of $q_2$.

In the 4th row, similarly to the 20th row of FIG. 3, a transition destination state $q_{n2}$ is created.

In the 5th row, it is determined whether or not the created $q_{n2}$ is included in $Q_2$. If $q_{n2}$ is not included in $Q_2$, the processing of the 6th row is performed.

In the 6th row, the final output $\rho_2(q_{n2})$ of $q_{n2}$ is set as an empty set, and $q_{n2}$ is added to $Q_2$ and $F_2$.

In the 7th row, it is determined whether or not the size of W is greater than N. When the size of W is greater than N, the processing from the 8th row to the 10th row is repeatedly performed.

In the 8th row, one output symbol is extracted from W and is set as w. With regard to a way to extract, for example, an output symbol may be extracted from a long output symbol sequence from among the output symbol sequences included in W. An output symbol may be extracted from a short output symbol sequence.

In the 9th row, a transition in which a transition source state is $q_2$, an input symbol is $aux(q_{n2},w)$, an output symbol sequence is w, and a transition destination state is $q_{n2}$ is added to $E_2$. The input symbol of the added transition is added to $\Sigma_2$.

In the 10th row, w is removed from W.

In the 11th row, the output symbols which remain in W are assigned to the final output $\rho_2(q_2)$ of $q_2$.

(Hardware Configuration)

FIG. 19 is a block diagram illustrating the hardware configuration of a determinizing device 2700 which is necessary for carrying out the method described in this embodiment. As illustrated in FIG. 19, the determinizing device 2700 includes a CPU (Central Processing Unit) 1, an operating unit 2, a display unit 3, a ROM (Read Only Memory) 4, a RAM (Random Access Memory) 5, a storage unit 6, a bus 7, and the like. The respective units are connected to each other through the bus 7.

The CPU 1 performs various kinds of processing in cooperation with various control programs stored in advance in the ROM 4 or the storage unit 6 with a predetermined area of the RAM 5 as a work area, and performs overall control of the operations of the respective units which constitute the determinizing device 2700. The CPU 1 realizes the functions of respective functional units described below in cooperation with a predetermined program stored in the ROM 4 or the storage unit 6.

The operating unit 2 is an input device, such as a mouse or a keyboard, receives information input from a user as an instruction signal, and outputs the instruction signal to the CPU 1. The display unit 3 is constituted by a display device, such as an LCD (Liquid Crystal Display), and displays various kinds of information on the basis of a display signal from the CPU 1.

The ROM 4 unrewritably stores a program relating to the control of the determinizing device 2700, various kinds of setting information, or the like. The RAM 5 is a storage medium, such as an SDRAM, and functions as a work area of the CPU 1. Specifically, the RAM 5 functions as a buffer or the like which temporarily stores various variables or parameter values generated at the time of the determinizing processing.

The storage unit 6 has a semiconductor storage medium, such as a flash memory, or a magnetically or optically recordable storage medium, and rewritably stores a program relating to the control of the determinizing device 2700, various kinds of setting information, or the like. The storage unit 6 stores various kinds of information relating to an FST in advance or records an FST as the processing result of the determinizing processing.

(Processing Unit Configuration)

Figure 20:
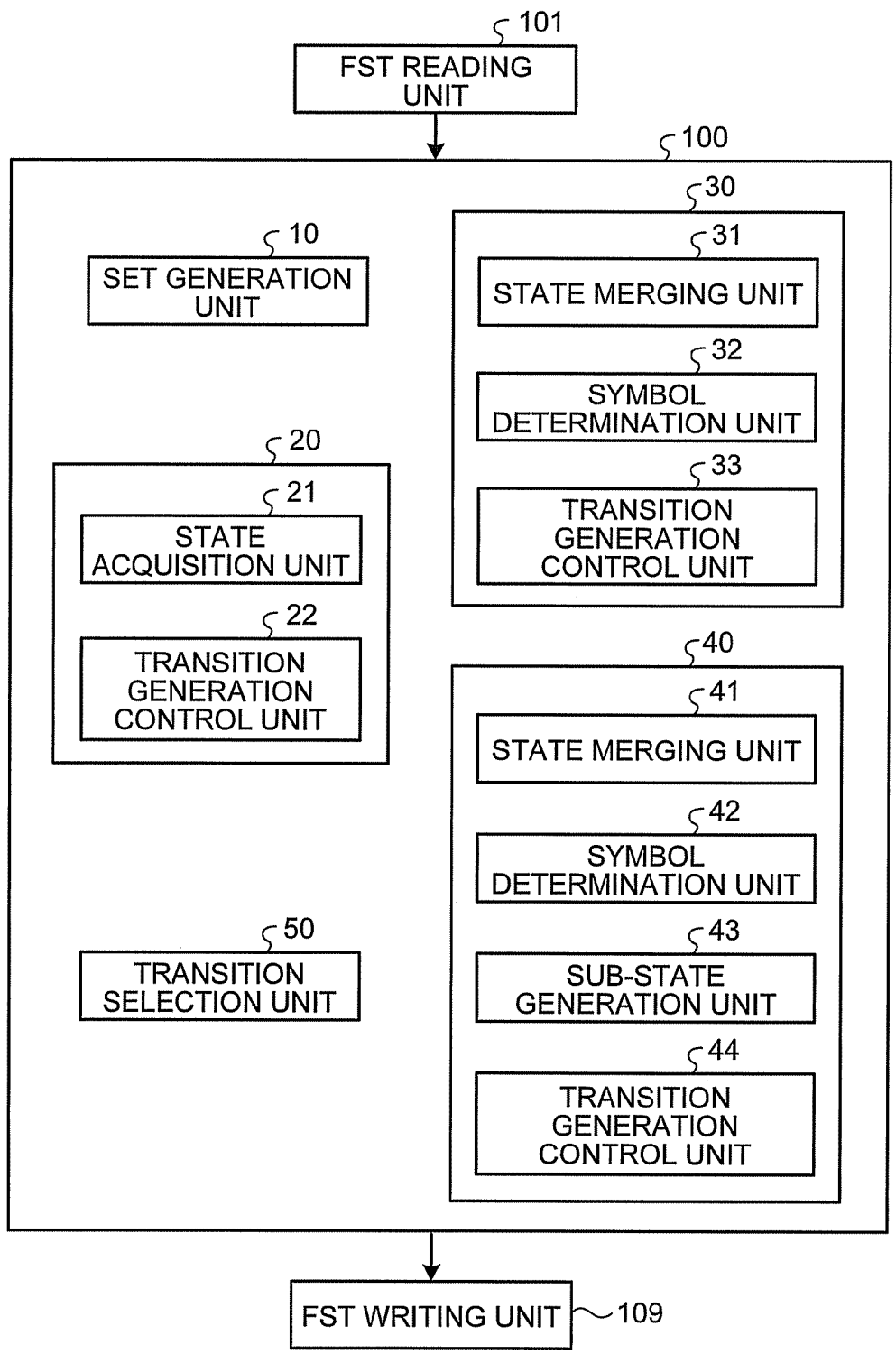
FIG. 20 is a diagram illustrating an example of the functional configuration of a finite state transducer determinizing device of this embodiment.

FIG. 20 is a diagram illustrating the functional configuration of a determinizing device which executes a finite state transducer determinizing method of this embodiment. A determinizing device 100 of FIG. 20 receives an FST from an FST reading unit 101 as an input, and outputs a determinized FST to a FST writing unit 109.

The determinizing device 100 has a set generation unit 10, a single-valued state processing unit 20, a final state processing unit 30, a single-value processing unit 40, and a transition selection unit 50.

The set generation unit 10 generates a set including states, input symbols and output symbols assigned to transitions corresponding to the states, and states of a transition destination from the FST input from the FST reading unit 101. With regard to a set corresponding to an FST after determinizing, a set including an empty set is generated. Other sets which are used as a work area, or the like are generated. The generated sets are processed by the single-valued state processing unit 20, the final state processing unit 30, the single-value processing unit 40, and the transition selection unit 50, and FST determinizing is performed. The set generation unit 10 also performs the processing from the 1st row to the 4th row of FIG. 3.

The single-valued state processing unit 20 has a state acquisition unit 21 and a transition generation control unit 22. The state acquisition unit 21 acquires a state, in which processing is not yet performed for generating an outgoing transition from the corresponding state, from among the states after determinizing from the sets generated by the set generation unit 10. This state is called a state during the determinizing processing, and corresponds to $q_2$ of FIG. 3. The transition generation control unit 22 generates an outgoing transition and the state of a transition destination from the state during the determinizing processing, and includes the generated states in the FST after determinizing.

The single-valued state processing unit 20 performs the processing from the 6th row to the 12th row of FIG. 3. The state acquisition unit 21 performs the processing of the 6th row of FIG. 3. The transition generation control unit 22 performs the processing from the 7th row to the 12th row of FIG. 3.

The final state processing unit 30 generates a final state of an FST. The final state processing unit 30 has a state merging unit 31, a symbol determination unit 32, and a transition generation control unit 33. The state merging unit 31 acquires one or a plurality of final outputs corresponding to the state during the determinizing processing.

When a plurality of final outputs are acquired by the state merging unit 31, if necessary, the symbol determination unit 32 determines an identification symbol corresponding to a transition generated by the transition generation control unit 33. The determined identification symbol is different from any input symbol included in an FST read by the FST reading unit 101. The transition generation control unit 33 performs overall control of the processing for generating a transition or a final state.

The final state processing unit 30 performs the processing from the 13th row to the 23rd row of FIG. 3. The state merging unit 31 performs the processing of the 15th row of FIG. 3. The symbol determination unit 32 performs the processing the function aux in the processing of the 21st row of FIG. 3. The transition generation control unit 33 performs processing, excluding the processing by the state merging unit 31 and the symbol determination unit 32, in the processing from the 13th row to the 23rd row of FIG. 3.

The single-value processing unit 40 merges a plurality of transitions assigned to the same input symbol to a single value and performs determinizing. The single-value processing unit 40 has a state merging unit 41, a symbol determination unit 42, a sub-state generation unit 43, and a transition generation control unit 44.

The state merging unit 41 acquires a plurality of states at a transition destination by the same input symbol from among the sets generated by the set generation unit 10, and generates states having the states as sub-states. Even when there is one state of a transition destination by the same input symbol, similarly to a case where there are a plurality of states of a transition destination, if the corresponding state has sub-states, processing relating to the sub-states is facilitated.

The symbol determination unit 42 generates one or a plurality of identification symbols, which are handed as input symbols, for one state generated by the state merging unit 41. The generated identification symbols correspond to the output symbols assigned to one or a plurality of outgoing transitions from one state. Here, similarly to the symbol determination unit 32, the determined identification symbols are different from any input symbols included in the FST read by the FST reading unit 101. The sub-state generation unit 43 generates sub-states which are included in the states generated by the state merging unit 41. The identification symbols generated by the symbol determination unit 42 correspond to the states generated by the state merging unit 41.

The transition generation control unit 44 performs overall control of the processing performed by the single-value processing unit 40.

The state merging unit 41 performs the processing of the 25th row of FIG. 3. The symbol determination unit 42 performs the processing by the function aux in the processing of the 29th row of FIG. 3. The sub-state generation unit 43 performs the processing of the 27th row and the 34th row of FIG. 3. The transition generation control unit 44 performs processing, excluding the processing by other processing units of the single-value processing unit 40, in the processing from the 24th row to the 37th row of FIG. 3.

When an input FST is a weighted FST, the transition selection unit 50 selects a transition as an optimum path on the basis of a weight.

(Specific Example of FST in Speech Recognition)

An FST is used in the fields of speech recognition or natural language processing. As an example, a method is used which realizes a function of converting a phoneme string to a word as an NFST. In general, in this NFST, determinizing processing is performed. This is because, if an input symbol is applied, the state of a transition destination from each state is uniquely determined and easily handled. At this time, if there are homophonous, different words are assigned to the same phonetic string. That is, a non-single-valued NFST is created.

Figure 21:
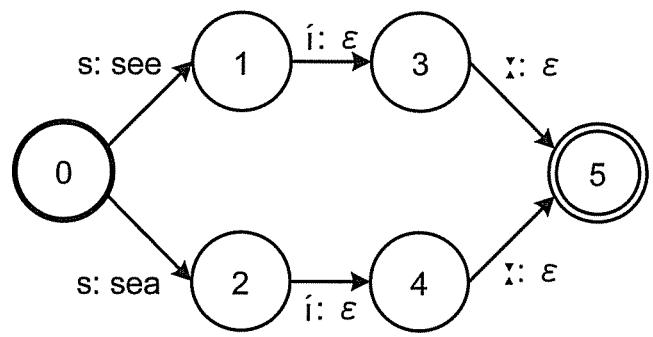
FIG. 21 is a diagram illustrating an example of an FST in speech recognition.

Specifically, it becomes as illustrated in FIG. 21. In this example, an input symbol is a phonetic symbol, and an output symbol sequence is a word. In converting a phonetic string over several words, in this drawing, it is desirable to create a transition from the state 5, in which both the input symbol and the output symbol are s, to the state 0.

(Specific Example of FST in Translation)

Figure 22:
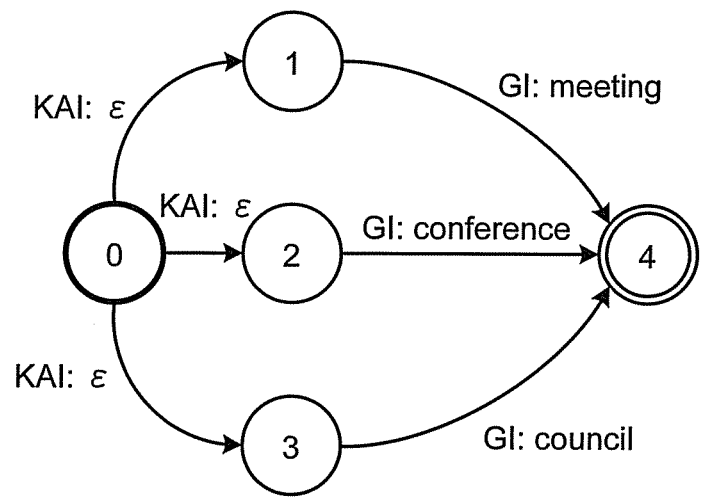
FIG. 22 is a diagram illustrating an example of an FST in translation.

Since an FST which converts an utterance to words can be realized, similarly, it is assumed that letters of any language are assigned to input symbols, and letter strings of another language are assigned to output symbols. For example, since a Japanese letter string "KAIGI" can be translated to meeting, conference, council, or the like in English, with the use of an FST, this is expressed as illustrated in FIG. 22. In this example, since an FST is not single-valued, when an FST with no final output assigned is used, it is not possible to perform determinizing by the method of the related art. In continuously translating one word or a plurality of words in another language, it can be expressed that the transition destination of a transition from the states 1, 2, and 3 to the state 4 is changed to the state 0. At this time, even when an FST with a plurality of final outputs assigned is used, it is not possible to perform determinizing by the method of the related art without preprocessing for adding an auxiliary input symbol. According to the method of this embodiment, it is possible to perform determinizing without preprocessing.

(Specific Example of FST in Retrieval)

If a target sentence to be retrieved is expressed by an FST, it becomes possible to facilitate retrieval in a document.

Figure 23:
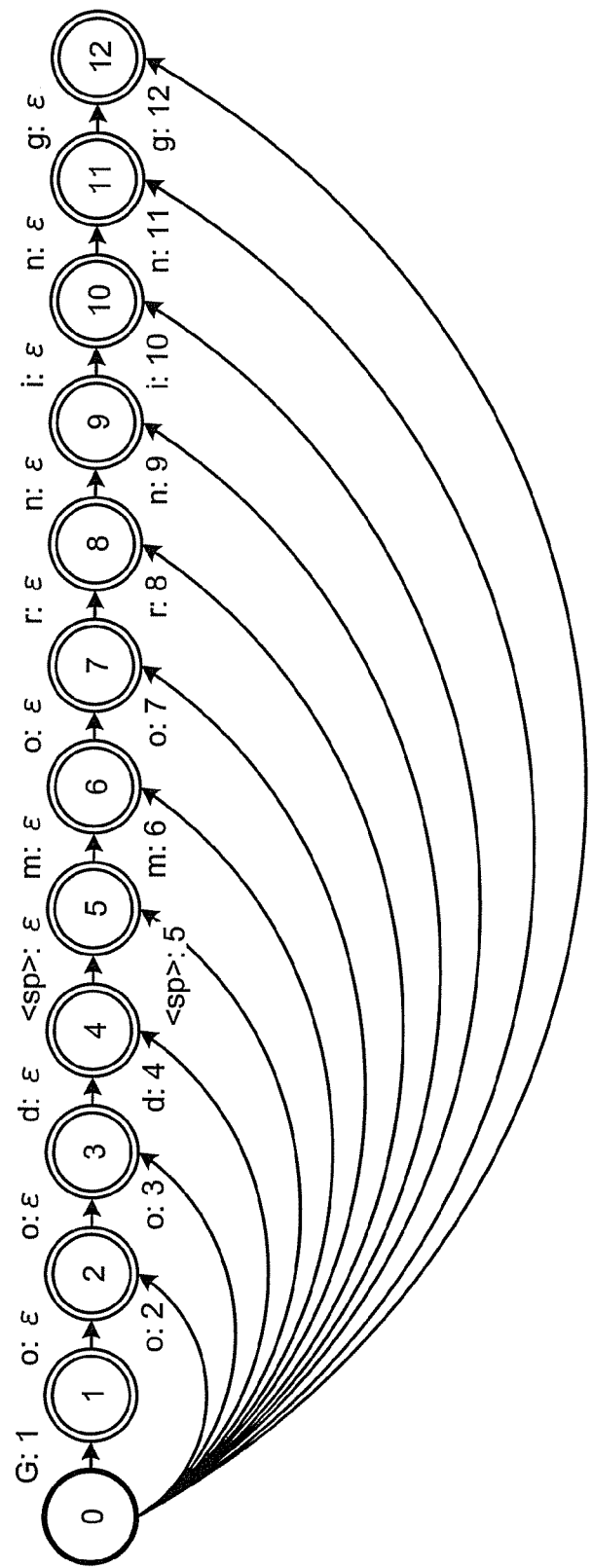
FIG. 23 is a diagram illustrating an example of an FST before determinizing in retrieval.

For example, a sentence "Good morning" is given. Let the head "G" of the sentence be the first letter, and next "o" be the second letter. An FST illustrated in FIG. 23 is created in which the position of each letter in the sentence is an output symbol, and a letter in the sentence is an input symbol. Let <sp> be a space. For example, in retrieving the position where a letter string "rni" in the sentence appears, an input symbol sequence "rni" is input to the FST. When this happens, a transition is made to the state 0, the state 8, the state 9, and the state 10, and an output symbol sequence becomes "8." That is, it can be understood that "rni" appears in the eighth letter. In the case of a transition from the state 0 in which "o" is assigned to an input symbol, there are three transitions of "o:2," "o:3," and "o:7." Since all the transition destinations of the transitions are final states, if "o" is input as an input symbol sequence, three types of 2, 3, and 7 can be output. That is, the FST is non-single-valued.

If an FST is determinized, a letter string to be retrieved, that is, the path in the FST with respect to the input symbol sequence is uniquely determined, making it possible to reduce the amount of calculation at the time of retrieval compared to a case where an FST is not determinized. Meanwhile, since the FST is non-single-valued, it is not possible to perform determinizing by the determinizing method of the related art. Thus, with the use of determinizing of this embodiment, determinizing is performed while a non-single-valued FST is modified to a single-valued FST. At the time of retrieval using a determinized FST, all the transitions having an auxiliary input symbol may be regarded as e transitions. A c transition is a transition when the transition to the next state is possible without consuming input symbols.

Figure 24:
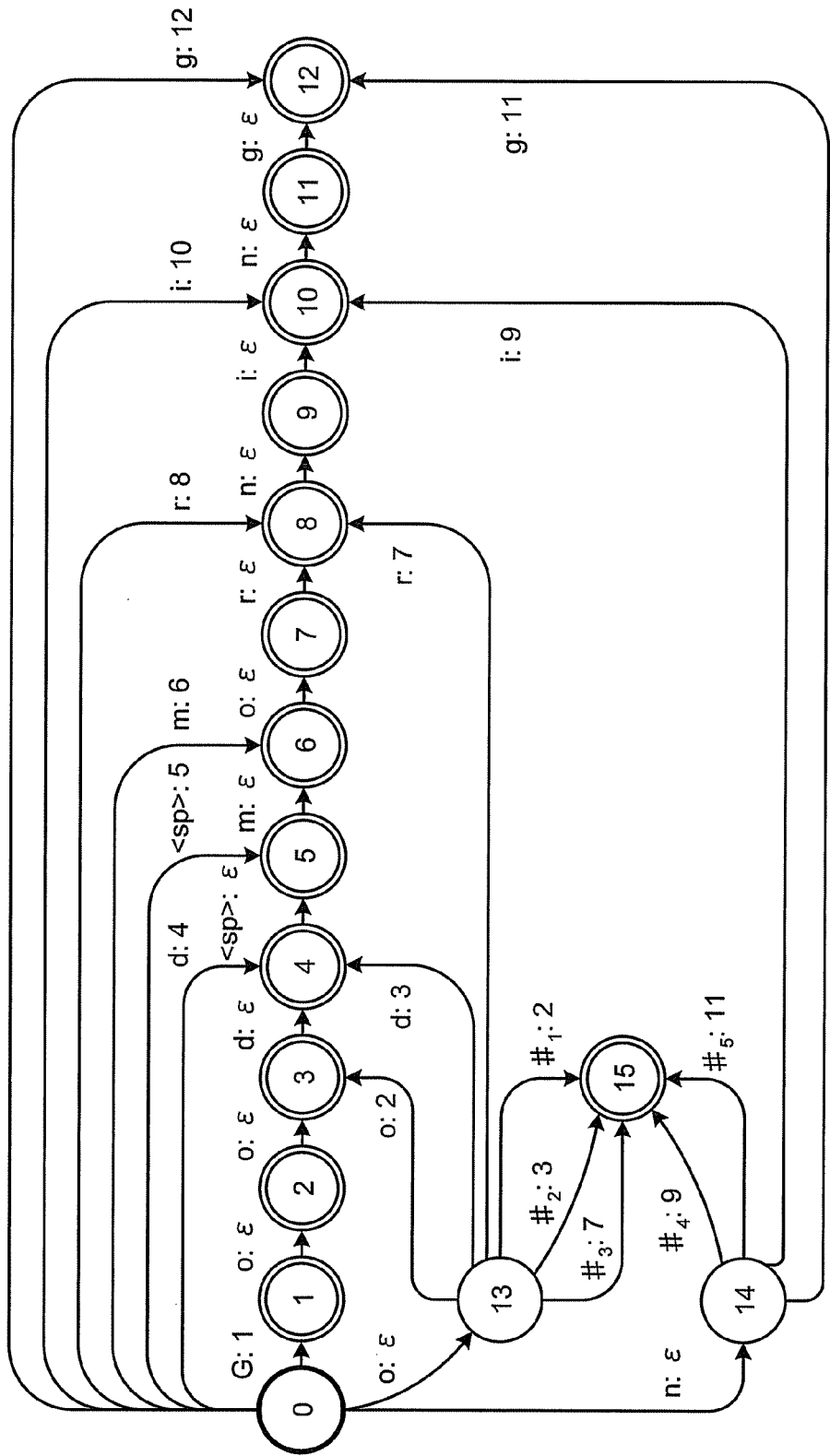
FIG. 24 is a diagram illustrating an example of an FST after determinizing in retrieval.

An FST which is obtained by determinizing the FST of FIG. 23 by the method of this embodiment is shown in FIG. 24. If an input symbol sequence "o" is input to the FST after determinizing, the state 0 as an initial state is transited to the state 13. Since $\#_1$, $\#_2$, and $\#_3$ as an auxiliary input symbol are regarded as $\epsilon$, the destination at which the transition can be made without consuming the input symbol sequences input to the FST is the state 15 only. Since the output symbol sequences of these transitions are 2, 3, and 7, the position in which "o" in the sentence appears is at the second letter, the third letter, and the seventh letter. If an input symbol sequence input to the FST is "or," there is only one path in which the state 0 is transited to the state 8 through the state 13, and the output symbol of the path is 7. That is, the position where "or" appears is at the seventh letter.

(Effects)

As described above, according to this embodiment, it is possible to perform determinizing while modifying a non-single-valued FST to a non-single-valued FST without processing for modification to a single value in advance.

Second Embodiment

Preparation

In this embodiment, in a determinizing method of a weighted finite state transducer (WFST) in which a weight is applied, in addition to the input symbols and the output symbol sequences assigned to the transitions of the FST, a method which performs determinizing while converting a non-single-valued WFST to a single value will be described. The term "weight" used herein is any probability value, a score, a penalty, or the like, and is calculated by any rule (addition, multiplication, minimum value, maximum value, or the like) along a path in which an input symbol is received.

Let a set of values of the weight be $R_w$. $R_w$ is, for example, an integer or a real number. Let a set of output symbols which is represented by $\Delta$ in the case of an FST be $R_o$. Then, a WFST can be expressed by a nine-tuple $(Q, \Sigma, R_o, R_w, E, I, F, \lambda, \rho)$. Q, $\Sigma$, I, F, $\lambda$, and $\rho$ are the same as an FST. A set E of transitions is $E \subset Q \times \Sigma \times \Delta \times Q$. Here, $\Delta$ is an output, and $\Delta = R_o^* \times R_w$. Let out(e)$\in \Delta$ such that an output symbol sequence and a weight assigned to a transition e$\in$E are the same as an FST. That is, out(e) represents a two-tuple (output symbol sequence and weight) assigned to a transition e. When an initial state is i$\in$I, an initial output function $\lambda$ is $\lambda(i)\in \Delta$. Similarly, when a final state is q$\in$F, a final output function is $\rho(q)\in \Delta$.

(Method)

If the calculation method of the output $\Delta$ is defined as follows, the determinizing method of first embodiment can be used in determinizing a non-single-valued WFST as it is.

The operations $(+)_o$ and $(\times)_o$ of an output symbol sequence $R_o$ and a special value $1^\#_o$ are defined to be the same as in first embodiment. That is, $(+)_o$ is defined as a longest common prefix operation, $(\times)_o$ is defined as a conjunction operation, and $1^\#_o$ is defined as an empty symbol sequence $\epsilon$.

The operations $(+)_w$ and $(\times)_w$ of a weight $R_w$ and a special value $1^\#_w$ are defined, for example, as follows. For the values $x, y \in R_w$, $x(+)_w y = \min(x,y)$ and $x(\times)_w y = x+y$ are defined, and $1^\#_w = 0$ is defined. This is a calculation method which is called tropical semiring in C. Allauzen, M. Mohri, Generalized Optimization Algorithm for Speech Recognition Transducers, 2003, In Proceedings of the International Conference on Acoustics, Speech, and Signal Processing (ICASSP'03). Besides, $x(+)_w y = x+y$ and $x(\times)_w y = x \times y$ may be defined, and $1^\#_w = 1$ may be defined. A calculation method may be used which is called log semiring in C. Allauzen, M. Mohri, "Generalized Optimization Algorithm for Speech Recognition Transducers," 2003, In Proceedings of the International Conference on Acoustics, Speech, and Signal Processing (ICASSP'03).

If the calculation method of an output symbol sequence and a weight is defined as described above, the operations (+)

and (×) of an output Δ having two-tuples of an output symbol sequence and a weight and the special value $1^{\#}$ can be respectively defined as $(x_1,y_1)(+)(x_2,y_2)=(x_1(+)_o x_2, y_1(+)_w y_2)$, $(x_1, y_1)(\times)(x_2,y_2)=(x_1(\times)_o x_2, y_1(\times)_w y_2)$ and $1^{\#}=(1^{\#}_o, 1^{\#}_w)$ with $x_1, x_2 \in R_o$ and $y_1, y_2 \in R_w$. An operation $\cup$ of a sum of sets relating to the output Δ is defined by the following expression.

$$\{(x_1, y_1)\} \cup \{(x_2, y_2)\} = \begin{cases} \{(x_1, y_1 \oplus_w y_2)\} & \text{if } x_1 = x_2 \\ \{(x_1, y_1), (x_2, y_2)\} & \text{if } x_1 \neq x_2 \end{cases} \quad (1)$$

Figures 25, 26:
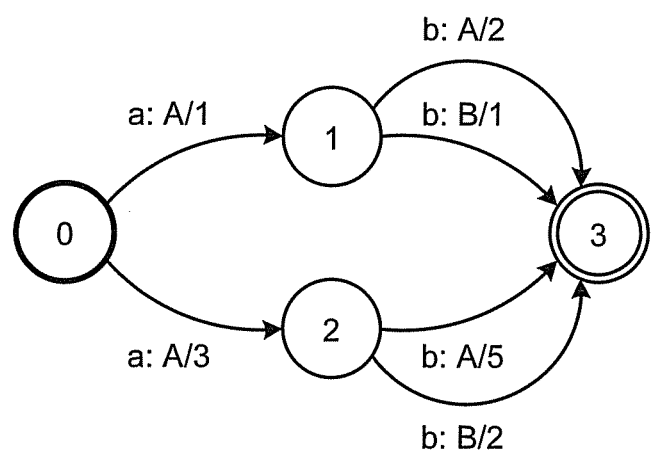
FIG. 25 is a pseudo code of processing for appending an auxiliary input symbol to a weighted FST.
FIG. 26 is a diagram illustrating a WFST before determinizing.

With a state $q \in Q_2$ after determinizing and an output $v \in \Delta$ as arguments, an algorithm aux which returns an auxiliary input symbol as a return value is as illustrated in FIG. 25. Processing is performed such that, when the output symbol sequence and the weight of the output A are respectively x and y, $aux_0$ is called with the state q and the output symbol sequence x in the 2nd row as arguments, and the return value is returned.

Here, $aux_0$ corresponds to the algorithm aux used in first embodiment, and is, for example, the method illustrated in FIG. 4.

If (+), (×), $1^{\#}$, $\cup$, and aux which are used in FIG. 3 are defined again as described above, with regard to a non-single-valued WFST, it is possible to perform determinizing while carrying out modification to a single value by the method of FIG. 3.

Example

How the determinizing method of a WFST in this embodiment operates will be described assuming that a WFST of FIG. 26 is WFST $T_1$ before determinizing, and a WFST after determinizing is $T_2$. An initial output and a final output are $1^{\#}$ and not illustrated in the drawing.

From FIG. 26, $Q_1=\{0,1,2,3\}$, $I_1=\{0\}$, $F_1=\{3\}$, $\Sigma_1=\{a,b\}$, and $R_o=\{A,B\}$. Let $R_w$ be an integer. Similarly to the drawings of the FST in first embodiment, a bold-line circle is an initial state, and a double-line circle is a final state. Of the labels of the respective transitions, the left side of ":" is an input symbol, an output symbol sequence is given between ":" and "/," and the right side of "/" is a weight. In this example, it is assumed that the weights $x,y \in R_w$ are calculated by $x(+)_w y=\min(x,y)$ $x(\times)_w y=x+y$, and $1^{\#}_w=0$. Then, since $x^{-1}(\times)x=1^{\#}_w$ and $x^{-1}+x=0$, $x^{-1}=-x$.

In the 1st row of FIG. 3, first, a WFST after determinizing is initialized. Next, in the 2nd row, an initial output is calculated. In this example, the WFST has no initial output. In other words, $\lambda_1(0)=1^{\#}=(\epsilon,0)$, that is, an empty symbol sequence and a weight 0 are output. Thus, $\lambda_2=(\epsilon,0)$.

Figure 27:
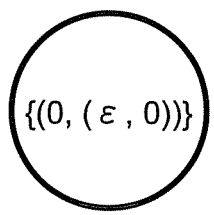
FIG. 27 is a diagram illustrating the initial state of a WFST after determinizing.

In the 3rd row, an initial state of a WFST after determinizing is created. $i_2=\{(0,(\epsilon,0))\}$ (FIG. 27).

In the 4th row, the state $i_2$ created in the 3rd row is added to the stack S and $Q_2$. As a result, $S=\{\{(0,(\epsilon,0))\}\}$ and $Q_2=\{\{(0,(\epsilon,0))\}\}$.

Since $|S|=1$, the condition of the 5th row is satisfied, and the processing progresses to the 6th row.

In the 6th row, if a value is extracted from the stack S and substituted in $q_2$, $S=\phi$ and $Q_2=\{(0,(\epsilon 0))\}$.

In the 7th row, w should be determined only when $w=(\epsilon,0)$. Since w is not included in $\Sigma_1$, the condition of the 7th row is not satisfied. Thus, the processing progresses to the 14th row.

In the 14th row, it is determined whether or not a state from among the two-tuples (state and output) included in $q_2$ is included in $F_1$. Now, a state included in $q_2$ is the state 0 only, and the state 0 is not included in $F_1$. Thus, the processing progresses to the 24th row.

Although $\Sigma_1=\{a,b\}$, an input symbol of an outgoing transition from the state 0 is a only, such that the processing may be performed only when a=a. Thus, in the 24th row, a=a, and the processing of the 25th or subsequent row is performed.

In the 25th row, $\theta=\{(1,\{(\epsilon,0)(\times)(A,1)\}), (2,\{(\epsilon,0)(\times)(A,3)\})\}=\{(1,\{(\epsilon(\times)_o A, 0(\times)_w 1)\}),(2,\{(\epsilon(\times)_o A, 0(\times)_w 3)\})\}=\{(1,\{(A,0+1)\}),(2,\{(A,0+3)\})\}=\{(1,\{(A,1)\}), (2,\{(A,3)\})\}$.

Since there is no element of θ which satisfies the condition $|W|>1$ of the 26th row, the processing progresses to the 32nd row.

Since there is an element of θ which satisfies the condition $|W|=1$, the condition of the 32nd row is satisfied, and the processing progresses to the 33rd row.

In the 33rd row, $w_2=(A,1)(+)(A,3)=(A(+)_o A, 1(+)_w 3)=(A, \min(1,3))=(A,1)$.

In the processing of the 34th row, $q_{n2}=\{(1,(A,1)^{-1}(\times)(A,1)),(2,(A,1)^{-1}(\times)(A,3))\}=\{(1,(A^{-1}(\times)_o A,1^{-1}(\times)_w 1)),(2,(A^{-1}(\times)_o A,1^{-1}(\times)_w 3))\}=\{(1,(\epsilon,-1+1)),(2,(\epsilon,-1+3))\}=\{(1,(\epsilon,0)),(2,(\epsilon,2))\}$ is obtained.

Figure 28:
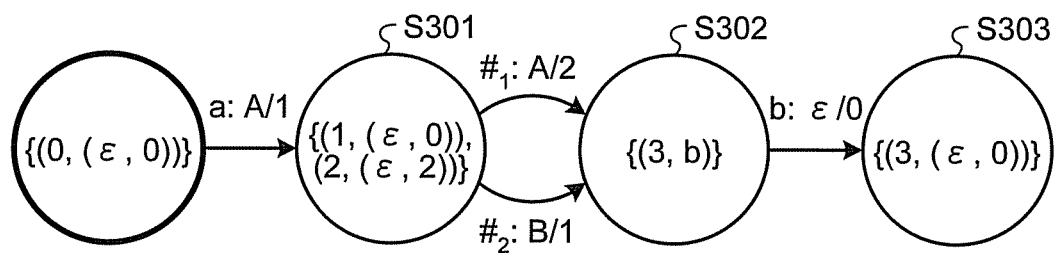
FIG. 28 is a diagram (first view) illustrating a WFST during determinizing processing.

In the 35th row, a transition in which a transition source state is $\{(0,(\epsilon,0))\}$, an input symbol is a, an output symbol is A, a weight is 1, and a transition destination state is $\{(1,(\epsilon,0)),(2,(\epsilon,2))\}$ is created and added to $E_2$. As a result, an FST is constituted by the initial state and the state S301 of FIG. 28 and the transition between these states.

Now, since $q_{n2}$ is not included in $Q_2$, the 36th row is satisfied, and the processing of the 37th row is performed.

In the 37th row, $q_{n2}$ is added to S and $Q_2$, such that $S=\{\{(1,(\epsilon,0)),(2,(\epsilon,2))\}\}$ and $Q_2=\{\{(0,(\epsilon,0))\},\{(1,(\epsilon,0)),(2,(\epsilon,2))\}\}$.

The processing returns to the 5th row, and since the stack S is not an empty set, the processing progresses to the 6th row.

In the 6th row, $q_2=\{(1,(\epsilon,0)),(2,(\epsilon,2))\}$, and $S=\phi$.

Since $(\epsilon,0)$ and $(\epsilon,2)$ are not included in $\Sigma_1$, the condition of the 7th row is not satisfied, and the processing progresses to the 14th row.

Since the states 1 and 2 are not included in $F_1$, that is, not a final state, the condition of the 14th row is not satisfied. Thus, the processing progresses to the 24th row.

Since an input symbol of an outgoing transition from the states 1 and 2 is b only, the processing from the 25th row to the 37th row may be performed only when α=b.

In the 25th row, $\theta=\{(3,\{(\epsilon,0)(\times)(A,2)\}\cup\{(\epsilon,0)(\times)(B,1)\}\cup\{(\epsilon,2)(\times)(A,5)\}\cup\{(\epsilon,2)(\times)(A,2)\})\}=\{(3,\{(A,2)\}\cup\{(B,1)\}\cup\{(A,7)\}\cup\{(A,4)\})\}=\{(3,\{(A,2(+)_w 7)\}\cup\{(B,1(+)_w 4)\})\}=\{(3,\{(A,\min(2,7))\}\cup\{(B,\min(1,4))\})\}=\{(3,\{(A,2)\}\cup\{(B,1)\})\}=\{(3,\{(A,2),(B,1)\})\}$.

In the 26th row, since the $(3,\{(A,2),(B,1)\})$ from the elements of θ satisfies the condition $|W|>1$, with regard to the corresponding element, the processing from the 27th row to the 31st row is performed.

In the 27th row, $q_{n2}=\{(q_n,\alpha)\}=\{(3,b)\}$, and the processing progresses to the 28th row.

Now, since $W=\{(A,2),(B,1)\}$, first, with regard to $w=(A,2)$, the processing of the 29th row is performed. Here, it is assumed that $aux(q_{n2},w)=aux(\{(3,b)\}$ and $(A,2))=\#_1$. If so, in the 29th row, a transition in which a transition source state is $\{(1,(\epsilon,0)),(2,(\epsilon,2))\}$, an input symbol is $\#_1$, an output is (A,2), and a transition destination state is $\{(3,b)\}$ is added to $E_2$, and $\#_1$ is added to $\Sigma_2$. Similarly, with regard to $w=(B,1)$, the processing is performed. At this time, if $aux(\{(3,b)\},(B,1))=\#_2$, a transition in which a transition source state is $\{(1,(\epsilon,0)),(2,(\epsilon,2))\}$, an input symbol is $\#_2$, an output is (B,1), and a transition destination state is $\{(3,b)\}$ is added to $E_2$, and $\#_2$ is added to $\Sigma_2$. As a result, an FST is constituted by the initial state, the state S301, and the state S302 of FIG. 28 and the transitions between the states.

In the 30th row, it is determined that {(3,b)} is not included in $Q_2$, and in the 31st row, {(3,b)} is added to S and $Q_2$. As a result, S={{(3,b)}} and $Q_2$={{(0,($\epsilon$,0))},{(1,($\epsilon$,0)),(2,($\epsilon$,2))}, {(3,b)}}.

Although the processing progresses to the 32nd row, since no element which satisfies |W|=1 is included in θ, the condition of the 32nd row is not satisfied. Thus, the processing of the 33rd or subsequent row is not performed, and the processing returns to the 5th row.

Since S is not an empty set, the processing progresses to the 6th row.

In the 6th row, $q_2$={(3,b)}. And, S=ϕ.

Since a symbol sequence included in $q_2$ is b, the condition of the 7th row is satisfied, and the processing progresses to the 8th row.

In the 8th row, q=3 and w=b.

In the 9th row, $q_{n2}$={(3,1$^{\#}$)}={(3,($\epsilon$,0))}.

In the 10th row, a transition in which a transition source state is {(3,b)}, an input symbol is b, an output symbol sequence is $\epsilon$, a weight is 0, and a transition destination state is {(3,($\epsilon$,0))} is added to $E_2$. As a result, an FST is constituted by all the states including the state S303 of FIG. 28 and the transitions.

Since $q_{n2}$={(3,$\epsilon$)}, the condition of the 11th row is satisfied, and the processing progresses to the 12th row.

In the 12th row, {{3,($\epsilon$,0)}} is added to S and $Q_2$. As a result, S={{(3,($\epsilon$,0))}} and $Q_2$={{(0,($\epsilon$,0))},{(1,($\epsilon$,0)),(2,($\epsilon$, 2))},{(3,b)},{(3, ($\epsilon$,0))}}.

Although the processing returns to the 5th row, since S is not empty, the processing progresses to the 6th row.

In the 6th row, $q_2$={(3,($\epsilon$,0))}. And, S=ϕ. Since a symbol sequence included in $q_2$ is ($\epsilon$,0) only, the condition of the 7th row is not satisfied. For this reason, the processing progresses to the 14th row.

Since the state 3 is a final state, the condition of the 14th row is satisfied, and the processing progresses to the 15th row.

Since $\rho_1$(3)=($\epsilon$,0), in the 15th row, W={($\epsilon$,0)(×)($\epsilon$,0)}={($\epsilon$, 0)}.

In the 16th row, $w_2$={($\epsilon$,0)}.

Since the number of elements of W is one, ($\epsilon$,0), the condition of the 17th row is satisfied, and the processing progresses to the 18th row.

Figure 29:
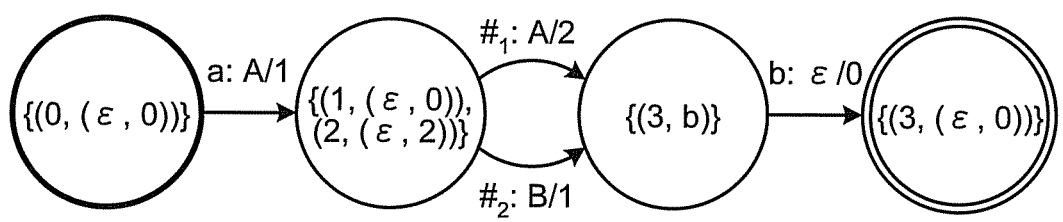
FIG. 29 is a diagram (second view) illustrating a WFST during determinizing processing.

In the 18th row, $\rho_2$({(3,($\epsilon$,0))})=($\epsilon$,0),$F_2$={{(3,($\epsilon$,0))}}. As a result, it becomes as illustrated in FIG. 29.

Since no element of W satisfies the 19th row, the processing of the 20th row to the 23rd row is not performed, and the processing progresses to the 24th row.

Since there is no outgoing transition from the state 3, even when the processing of the 24th or subsequent row is performed, nothing occurs.

Although the processing returns to the 5th row, since S is now an empty set, the condition of the 5th row is not satisfied. Thus, the determinizing processing is completed.

Figure 30:
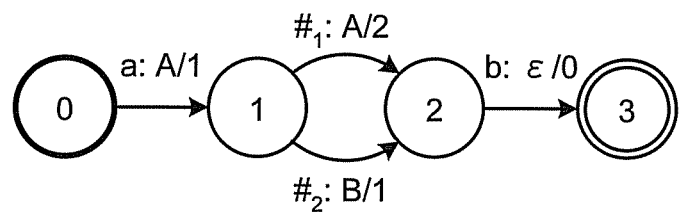
FIG. 30 is a diagram illustrating a WFST after determinizing.

Similarly to the FST, a set of two-tuples associated with the states may be substituted with numbers and may be as illustrated in FIG. 30.

(Specific Example in Speech Recognition)

Figure 31:
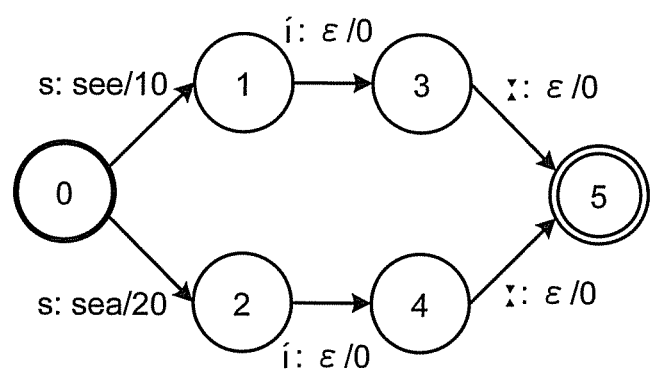
FIG. 31 is a diagram illustrating an example of a WFST in speech recognition.

As a specific example using a WFST, a WFST in which an insertion penalty is set as a weight for each word in a word dictionary of speech recognition is shown in FIG. 31. In this case, when see is output, an insertion penalty becomes 10, and when sea is output, an insertion penalty becomes 20. Other usage examples in the speech recognition are described in M. Mohri, M. Riley, D. Hindle, A. Ljolje, F. C. N. Pereira, "Full Expansion of Context-dependent Networks in Large Vocabulary Speech Recognition," 1998, In Proceedings of the International Conference on Acoustics, Speech, and Signal Processing (ICASSP'98), Seattle, Wash.

As described above, according to the method of second embodiment, determinizing can be performed while a non-single-valued WFST is modified to a single-valued WFST.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A finite state transducer determinizing device comprising:
   a symbol determination unit that generates an identification symbol different from any input symbol assigned to each transition of a finite state transducer;
   a state merging unit that extracts one or more states at a transition destination by the same input symbol from among the states of the finite state transducer and generates states having the extracted states as sub-states; and
   a single-value processing unit that applies the identification symbol as an input symbol of at least one transition between the states generated by the state merging unit to perform determinizing.

2. The device according to claim 1, further comprising a transition generation control unit that defines the state of a transition destination by an input with the identification symbol applied as the state of a transition destination of each of the sub-states.

3. The device according to claim 2, wherein the transition generation control unit defines an input symbol at the time of a transition from the next state of each of the sub-states as an input symbol corresponding to the next state before determinizing.

4. The device according to claim 2 or claim 3, wherein an output symbol from each of the sub-states to the next state includes empty.

5. The device according to claim 1, wherein, when there is a plurality of transitions, which transit by the same input symbol, from among transitions from one or more sub-states in the states generated by the state merging unit, there is a plurality of output symbols by the plurality of transitions, and the states of transition destinations by the plurality of transitions are the same,
   the state merging unit generates the states of transition destinations of the plurality of transitions, and
   the symbol determination unit applies identification symbols corresponding to the plurality of transitions.

6. The device according to claim 1, wherein the symbol determination unit associates each state generated by the state merging unit and the output symbol of a transition to the corresponding state with an identification symbol of the transition to the corresponding state.

7. The device according to claim 6, wherein the symbol determination unit uniquely determines the identification symbol for each transition from one state.

8. The device according to claim 6, wherein the symbol determination unit uniquely determines the identification symbol for each state associated with the identification symbol and for each output symbol.

9. The device according to claim 1, further comprising a transition selection unit that, when the finite state transducer is a weighted finite state transducer, selects a transition as an optimum path from the transitions corresponding to the identification symbol on the basis of a weight.

10. A finite state transducer determinizing method comprising:
  generating, by a system comprising a processor, an identification symbol different from any input symbol assigned to each transition of a finite state transducer;
  extracting, by the system, one or more states at a transition destination by the same input symbol from among the states of the finite state transducer and generating states having the extracted states as sub-states; and
  applying, by the system, the identification symbol as an input symbol of at least one transition between the states generated to perform determinizing.

* * * * *